US005572970A

United States Patent [19]

Fukumura

[11] Patent Number: 5,572,970
[45] Date of Patent: Nov. 12, 1996

[54] SYSTEM FOR CONTROLLING OUTPUT POWER OF INTERNAL COMBUSTION ENGINE WITH A PLURALITY OF CYLINDERS

[75] Inventor: Tomohiro Fukumura, Yokosuka, Japan

[73] Assignee: Nissan Motor Co., Ltd., Yokohama, Japan

[21] Appl. No.: 310,750

[22] Filed: Sep. 22, 1994

[30] Foreign Application Priority Data

Sep. 28, 1993 [JP] Japan ................................. 5-241485

[51] Int. Cl.⁶ ............................................. F02B 77/00
[52] U.S. Cl. .................. 123/198 F; 180/197; 364/426.02
[58] Field of Search ........................ 123/198 F, 481, 123/416, 417; 180/197; 364/426.02, 426.03

[56] References Cited

U.S. PATENT DOCUMENTS

| | | |
|---|---|---|
| 2,652,038 | 9/1953 | Winkler . |
| 5,038,883 | 8/1991 | Kushi et al. ........................ 123/481 |
| 5,283,742 | 2/1994 | Wazaki et al. ..................... 123/481 |

FOREIGN PATENT DOCUMENTS

| | | |
|---|---|---|
| 58-8436 | 1/1983 | Japan . |
| 58-200048 | 11/1983 | Japan . |
| 1-130018 | 5/1989 | Japan . |
| 3-246334 | 11/1991 | Japan . |

Primary Examiner—Noah P. Kamen
Attorney, Agent, or Firm—Lowe, Price, LeBlanc & Becker

[57] ABSTRACT

A system for controlling an output power of an internal combustion engine having a plurality of cylinders for use in a traction control system including a wheel slippage detecting portion for detecting a wheel slippage, a command portion for determining an amount of a change in the output power of the engine in accordance with the detected wheel slippage, a control portion responsive to the amount of a change in the output power of the engine to provide a first control command for effecting a fuel cut-off control and a second control command for effecting an ignition timing retard control, a first control portion for performing the fuel cut-off control in accordance with the first control command, and a second control portion for performing the ignition timing retard control in accordance with the second control command, wherein when the first control command requires a change in the number of resting state, the ignition timing retard control is delayed such that the control of the output power of the engine can be carried out smoothly without causing undesired aberration in the output power.

20 Claims, 25 Drawing Sheets

FIG. 8

| Mode | F/C Cylinder Number | F/C Command Flag | | | | Retard Command Flag |
|---|---|---|---|---|---|---|
| | | #1 | #2 | #3 | #4 | |
| 0 | 0 | 0 | 0 | 0 | 0 | 0 |
| 1 | 0 | 0 | 0 | 0 | 0 | 1 |
| 2 | 1 | 1 | 0 | 0 | 0 | 0 |
| 3 | 1 | 1 | 0 | 0 | 0 | 1 |
| 4 | 2 | 1 | 1 | 0 | 0 | 0 |
| 5 | 2 | 1 | 1 | 0 | 0 | 1 |
| 6 | 3 | 1 | 1 | 1 | 0 | 0 |
| 7 | 3 | 1 | 1 | 1 | 0 | 1 |
| 8 | 4 | 1 | 1 | 1 | 1 | 0 |

FIG_13

FIG. 14

| Mode | F/C Cylinder Number | F/C Command Flag | | | | Retard Command Flag |
|---|---|---|---|---|---|---|
| | | #1 | #2 | #3 | #4 | |
| 0 | 0 | 0 | 0 | 0 | 0 | 0 |
| 1 | 0 | 0 | 0 | 0 | 0 | 1 |
| 2 | 0 | 0 | 0 | 0 | 0 | 2 |
| 3 | 1 | 1 | 0 | 0 | 0 | 0 |
| 4 | 1 | 1 | 0 | 0 | 0 | 1 |
| 5 | 1 | 1 | 0 | 0 | 0 | 2 |
| 6 | 2 | 1 | 1 | 0 | 0 | 0 |
| --- | --- | | | | | --- |
| 12 | 4 | 1 | 1 | 1 | 1 | 0 |

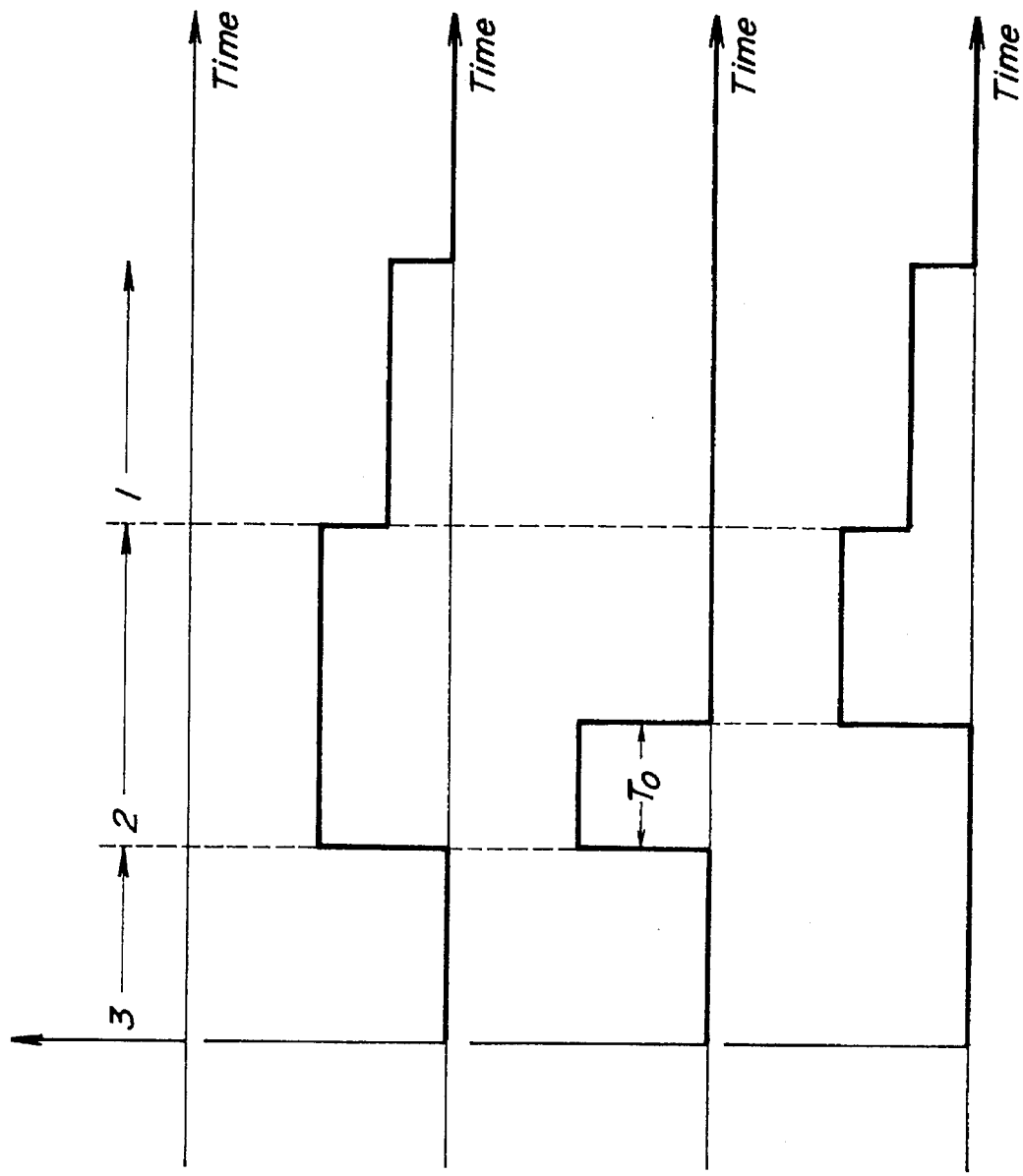

FIG_17
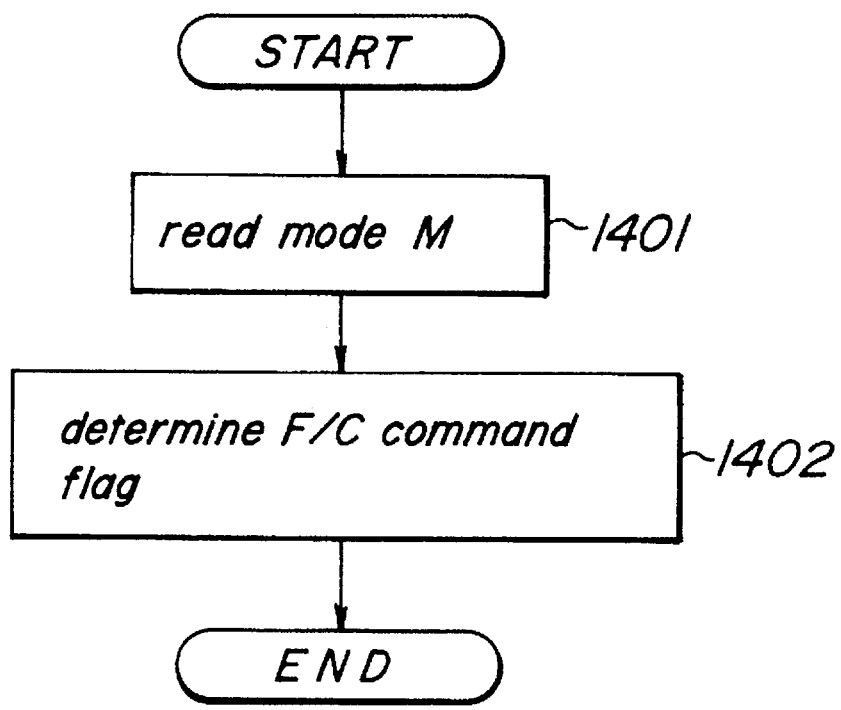

FIG_18

| Mode | F/C Cylinder Number | F/C Command Flags | | | |
|---|---|---|---|---|---|
| | | #1 | #2 | #3 | #4 |
| 0 | 0 | 0 | 0 | 0 | 0 |
| 1 | 0 | 0 | 0 | 0 | 0 |
| 2 | 1 | 1 | 0 | 0 | 0 |
| 3 | 1 | 1 | 0 | 0 | 0 |
| 4 | 2 | 1 | 1 | 0 | 0 |
| 5 | 2 | 1 | 1 | 0 | 0 |
| 6 | 3 | 1 | 1 | 1 | 0 |
| 7 | 3 | 1 | 1 | 1 | 0 |
| 8 | 4 | 1 | 1 | 1 | 1 |

FIG. 22

FIG_22

| Mode | 2 → | | | 1 → | | | | | | |
|---|---|---|---|---|---|---|---|---|---|---|
| Cylinder | #2 | #3 | #4 | #1 | #2 | #3 | #4 | #1 | #2 | #3 |
| Fuel Supply | ○ | ○ | ○ | × | ○ | ○ | ○ | ○ | ○ | ○ |
| Retard | – | – | – | (–) | – | – | – | R | R | R |
| F/C Cylinder Number | 1 | 1 | 1 | 1 | 1 | 1 | 1 | 0 | 0 | 0 |
| Actual Mode | 2 | 2 | 2 | 2 | 2 | 2 | 2 | 1 | 1 | 1 |

FIG.23
PRIOR ART

| Mode | F/C Cylinder Number | F/C Command #1 | #2 | #3 | #4 | Retard Command |
|---|---|---|---|---|---|---|
| 0 | 0 | ○ | ○ | ○ | ○ | — |
| 1 | 0 | ○ | ○ | ○ | ○ | R |
| 2 | 1 | × | ○ | ○ | ○ | — |
| 3 | 1 | × | ○ | ○ | ○ | R |
| 4 | 2 | × | × | ○ | ○ | — |
| 5 | 2 | × | × | ○ | ○ | R |
| 6 | 3 | × | × | × | ○ | — |
| 7 | 3 | × | × | × | ○ | R |
| 8 | 4 | × | × | × | × | — |

FIG. 24
PRIOR ART

| Mode | 2 → | | | | 1 → | | | | | |
|---|---|---|---|---|---|---|---|---|---|---|
| Cylinder | #2 | #3 | #4 | #1 | #2 | #3 | #4 | #1 | #2 | #3 |
| Fuel Supply | ○ | ○ | ○ | × | ○ | ○ | ○ | ○ | ○ | ○ |
| Retard | — | — | — | (—) | R | R | R | R | R | R |
| F/C Cylinder Number | 1 | 1 | 1 | 1 | 1 | 1 | 1 | 0 | 0 | 0 |
| Actual Mode | 2 | 2 | 2 | 2 | 3 | 3 | 3 | 1 | 1 | 1 |

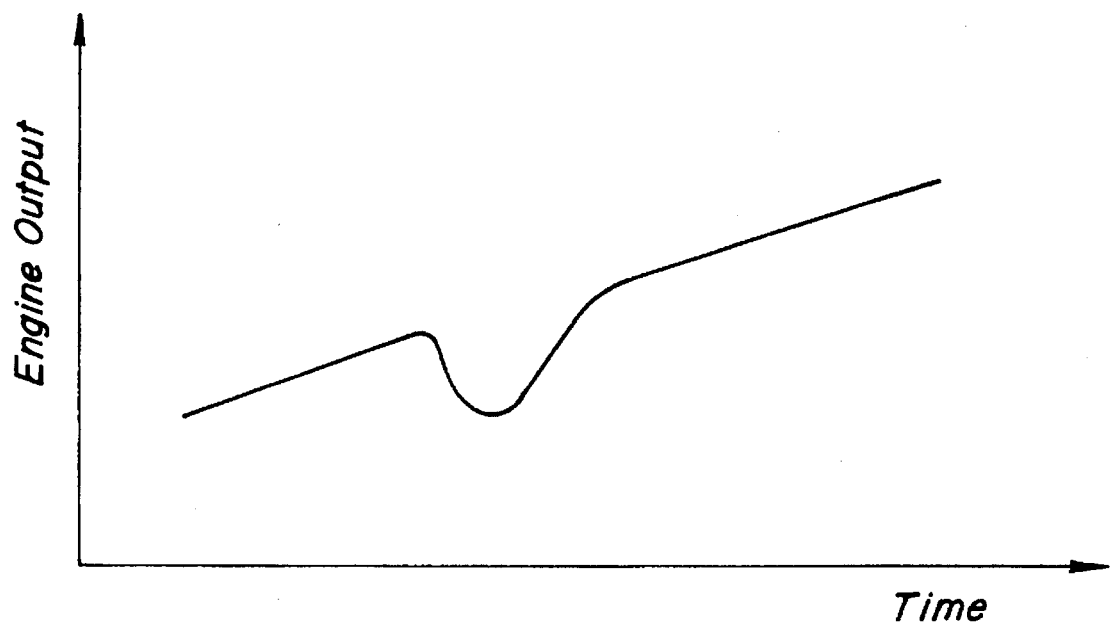
FIG_25
PRIOR ART

SYSTEM FOR CONTROLLING OUTPUT POWER OF INTERNAL COMBUSTION ENGINE WITH A PLURALITY OF CYLINDERS

BACKGROUND OF THE INVENTION

1. Field of the Invention

The present invention relates to a system for controlling an output power of an internal combustion engine, and more particularly to a system for controlling an output torque of an internal combustion engine having a plurality of cylinders with ignition plugs.

2. Description of the Related Art

In order to decrease the output torque of an internal combustion engine for controlling an engine output power, it has been proposed to place a part of or all of a plurality of engine cylinders in a resting state by cutting-off a supply of a fuel to relevant cylinder or cylinders. In the present specification, this control is called a fuel cut-off (F/C). This type of engine output control will be hereinafter referred to as "split cylinder control". Further, the above mentioned control system is applied to the traction control system (TSC) for improving the fuel consumption and drivability of automobiles.

In this case, to control or adjust the engine output torque in stepwise fashion, the number of the engine cylinders placed in the resting state is controlled.

In Japanese Unexamined Patent publications Nos. Kokai Sho 58-8436 and Kokai Hei 1-130018, an engine output control system is described in which the number of cylinders to be brought into the resting state is previously determined for respective control modes in accordance with an amount of the engine output to be decreased.

Also, it has been proposed to perform the engine output control by adjusting or retarding a spark ignition timing ill combination with the above-mentioned split cylinder control. For example, such a method has been disclosed in Japanese Unexamined Patent Publication Kokai Hei 3-246334.

In this known engine output control system, as shown in a data map of FIG. 23, a pattern for denoting one or more cylinders to be placed in resting state and a retard control of the spark ignition timing is previously formed in accordance with necessary amounts of reduction in the engine output. It should be noted that the data map shown in FIG. 23 is formed for controlling the output torque of a four cylinder engine. In this example, when the spark ignition timing retard control is performed, the engine output torque is reduced by 12.5% of the maximum power, said amount corresponding to a half of a nominal output torque produced by a single cylinder which is fired at a normal ignition timing. Hereinafter, this amount of the reduction in the engine output torque is referred to as torque down magnitude. In FIG. 23, #1, #2, #3 and #4 represent first, second, third and fourth cylinders, respectively which are successively fired in this order in the normal condition without the F/C control and retard' control. On the other hand, in F/C command, a circle mark represents an active cylinder which receives a fuel supply and a cross mark represents a resting cylinder due to the fuel cut-off. Also, in a retard command, a mark - represents the normal spark ignition timing and R represents the retarded ignition timing.

It should be noted that the above control is to reduce the output torque of the engine, but a similar control has to be carried out to increase the output torque of the engine during a torque recovery.

When both the split cylinder control and ignition timing retard control are performed in the engine output control, more precise output torque control than that achieved solely by the split cylinder control can be attained. However, the known systems for controlling the output torque of the internal combustion engine have the following problems.

Namely, although by a desired combination of the split cylinder control and the ignition timing retard control, the engine output torque can be decreased or increased in a desired manner during a steady state of the engine, there is a fear that desired engine output torque control cannot be achieved during a transition state of the engine. That is, during the engine transition state in which the number of resting cylinders is changed, desired engine output torque control cannot be performed in certain instances. In such a case, hunting of control might occur and the output torque of the engine might not be decreased or increased into a desired value stably.

The above mentioned problem will be further discussed in terms of the case illustrated in FIG. 24. FIG. 24 shows changes in various parameters such as control mode, cylinders to be fired, fuel supply command, retard command, the number of actually resting cylinders and actual mode when the operating mode is changed from the mode 2 to the mode 1 in accordance with the data map of FIG. 23. During the operation under the mode 2, responsive to a torque-up or torque recovery command, the mode is changed into the mode 1. In the mode 2, the number of cylinders to whom the supply of the fuel is cut-off (F/C cylinder number) is one and the spark ignition timing is not retarded, and in the mode 1, F/C cylinder number is zero, and the spark ignition timing is retarded.

When the torque-up or torque recovery command is given, the number of resting cylinders should be immediately changed to zero. However, in practice, the resting cylinder number does not become zero instantaneously due to a time lag in the operation of the engine. That is to say, the operating condition of the engine could not be changed at a high speed and there is always a time delay. Therefore, even if the command for changing the F/C cylinder number from 1 to 0 is provided, a resting cylinder could not be immediately returned into an active cylinder so that the torque recovery is delayed.

Accordingly, when the ignition timing retard control is performed immediately after varying the mode from the mode 2 to the mode 1, operations of both the mode 2 and mode 1 take place, and one of the cylinders still remains in the resting condition and at the same time the spark ignition timing retards. This operating condition corresponds to the mode 3. Therefore, the output torque cannot be increased as desired and the undesired hunting occurs in the output power of the engine during the transition as illustrated in FIG. 25. Thus, when the mode steps down to increase the engine output torque delivered[to the driving wheels as driving torque, retardation of the spark ignition timing becomes effective at an earlier timing than that at which the split cylinder control becomes effective so that the actual mode becomes equivalent to the step-up mode to cause unexpectedly lowering of the torque.

It should be noted that the above explained problem also occurs when the control mode changes to decrease the output torque of the engine. That is, during the transition in the torque down command, the output torque of the engine is not decreased smoothly, but shows an undesired aberration.

While the engine output control employing the split cylinder control and the spark ignition timing control in combination is able to precisely adapt the engine output torque to a demanded output torque restriction magnitude, the control will become more effective if the above mentioned problems of hunting and undesirable torque variation can be solved.

SUMMARY OF THE INVENTION

It is thus an object of the present invention to provide a novel and useful system for controlling an output torque of an internal combustion engine with a plurality of cylinders, in which an effectiveness of the control using both the split cylinder control and the spark ignition timing retard control in combination can be enhanced by solving the above mentioned problem.

According to a first concept of the invention, a system for controlling an output torque of an internal combustion engine having a plurality of cylinders comprises:

a command means for generating a control command which indicates an amount of increasing or decreasing an output torque of the internal combustion engine;

a judging means responsive to the control command supplied from the output change amount command means for providing a first command for controlling operation of the cylinders of the engine and a second command for controlling a retard of an ignition timing;

a first control means responsive to said first control command to bring one or more cylinders of the engine in a resting state;

a second control means responsive to said second control command to retard the ignition timing for cylinders which are not in the resting state; whereby when said first control command requires a change in the number of cylinder or cylinders to be rendered into the resting state, the retardation of the ignition timing to be performed by said second control command is delayed for a give delay time.

According to a second concept of the invention, a system for controlling an output torque of an internal combustion engine having a plurality of cylinders comprises:

a command means for producing a control command which indicates an amount of changing an output torque of the internal combustion engine;

a first judging means responsive to said control command produced by said command means to provide a first control command for denoting the number of cylinders which are to be brought into a resting state;

a first control means responsive to said first control command to render a given number of cylinders into the resting state;

a calculating means for calculating the number N of cylinders which have been in the resting state for a predetermined time period;

a second judging means responsive to said control command supplied by said command means as well as to the number N of resting cylinders calculated by said calculating means to provide a second control command; and a second control means responsive to said second control command to retard an ignition timing of active cylinders of the internal combustion engine.

Also in this control system, the output power of the internal combustion engine can be decreased or increased smoothly without producing an undesired aberration.

BRIEF DESCRIPTION OF DRAWINGS

FIG. 8 is a schematic view denoting an example of map data for F/C command flag and a retard command flag $f_r$ applicable for the routine of FIG. 7;

FIG. 14 is a schematic view depicting an example of map data for F/C command flag and a retard command flag $f_r$ applicable for the routine of FIG. 13;

FIGS. 16a to 16d are timing charts for performing the ignition timing retard control;

FIG. 17 is a flow chart of the control routine for making judgment for the engine operating condition in another embodiment of the control system according to the invention;

FIG. 18 is a schematic view showing an example of the map data of F/C command flag;

FIG. 22 is a schematic view showing a process for torque recovery in the control system according to the invention;

FIG. 23 is a schematic view depicting a setting map of an F/C pattern and a retard control in a known control system using the split cylinder control and a spark ignition timing control in combination;

FIG. 24 is a schematic view denoting a change in control condition in the known control system; and FIG. 25 is a graph showing a change in the output power during a torque recovery in the known control system.

DESCRIPTION OF THE PREFERRED EMBODIMENTS

Several preferred embodiments of the control system for an output torque of an internal combustion engine according to the present invention will be discussed hereinafter in detail with reference to FIGS. 1 to 22, but it should be noted that the present invention is not limited to these embodiments. In the following description, numerous specific details are set forth in order to provide a thorough understanding of the present invention, however it will be obvious to those skilled in the art that the present invention may be practiced without these specific details. Furthermore, well-known structures are not shown in detail so as not to unnecessarily obscure the present invention.

Figure 1:
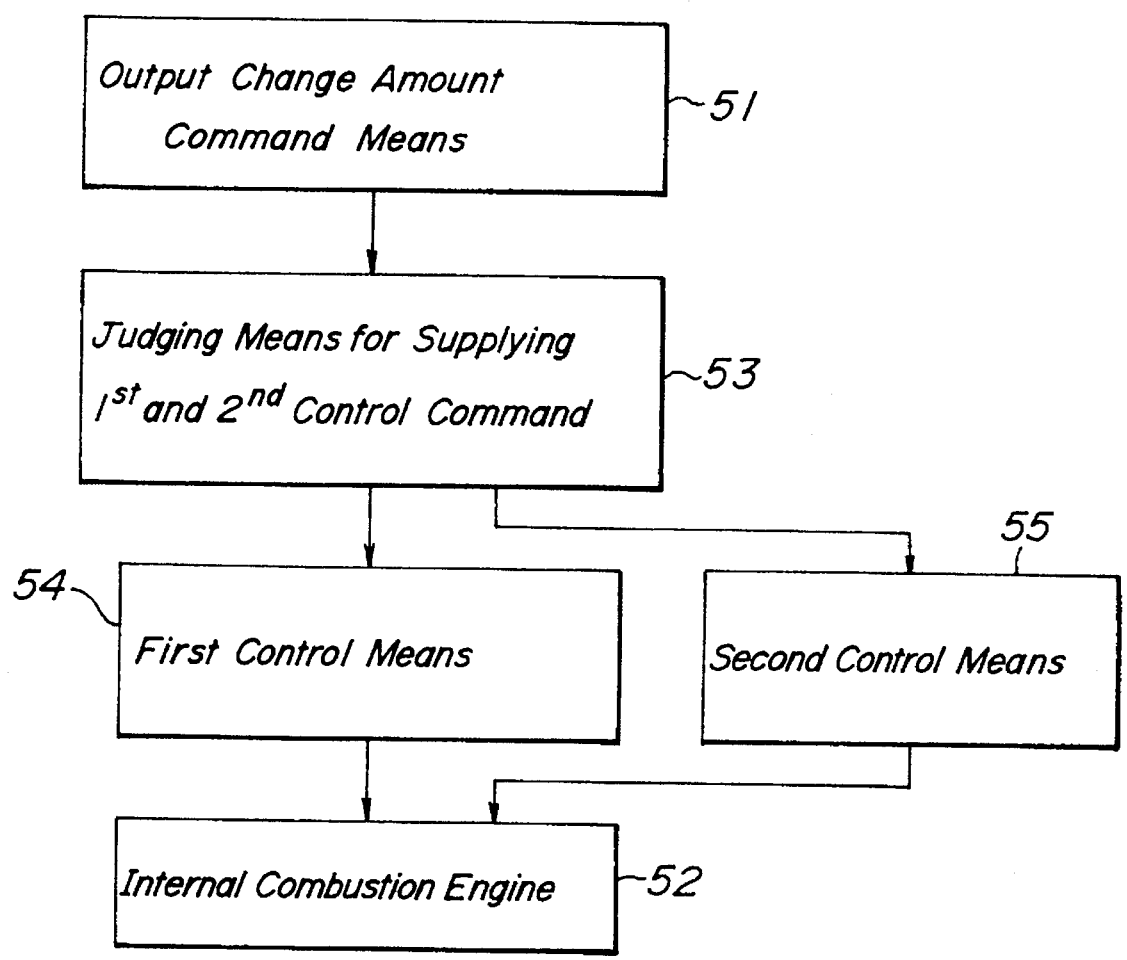
FIG. 1 is a flow chart showing a first concept of the output control system for internal combustion engine according to the present invention.

FIG. 1 is a block diagram illustrating a basic construction of the engine output power control system according to a first aspect of the present invention. In the first concept of the present invention, the ignition timing retard control denoted by a current control command is delayed when it is judged that the current control command requires a change in the number of resting cylinders or a change in the number of cylinders for which the supply of fuel is to be cut-off. As will be discussed, this judgment may be performed in various ways. For instance, a current control command may be checked to determine whether it includes a change in the F/C cylinder number, and if the control command requires a change in the F/C cylinder number, the command for performing the retard control for the ignition timing is delayed. Alternately, during the recovery to torque, when the last control command did not require the retard control, but the current control command requires the retard control, the retard control is delayed with respect to a change in the F/C cylinder number, and during the torque-down when the last control command required the retard control, but the current control command does not require the retard control, the retard control is kept operative for a given time period. It should be noted that the delay time by which the retard control for the ignition timing is delayed may be set constant, or it may be preferably variable in accordance with a running speed of the engine as will be explained later.

The engine output power control system according to the invention comprises an output change amount command means 51 for supplying a control command which indicates increasing or decreasing of an output power of an internal combustion engine 52 having a plurality of cylinders, a judging means 53 responsive to the control command supplied from the output change amount command means 51 for providing a first command for controlling the cylinders of the engine 52 and a second command related to the retard control for the ignition timing, a first control means 54 responsive to said first control command to make one or more cylinders inoperative, and a second control means 55 responsive to said second control command to retard the ignition timing.

According to the first concept of the invention, the judging means 53 is constructed such that when the first control command requires a change in the number of active or operative cylinders, the control by the second control command is delayed for a give delay time. Therefore, the control of the ignition timing is performed after the number of active cylinders has been changed, so that the output power of the internal combustion engine 52 can be accurately and smoothly controlled and any undesired aberration in the output torque could be effectively avoided.

Figure 2:
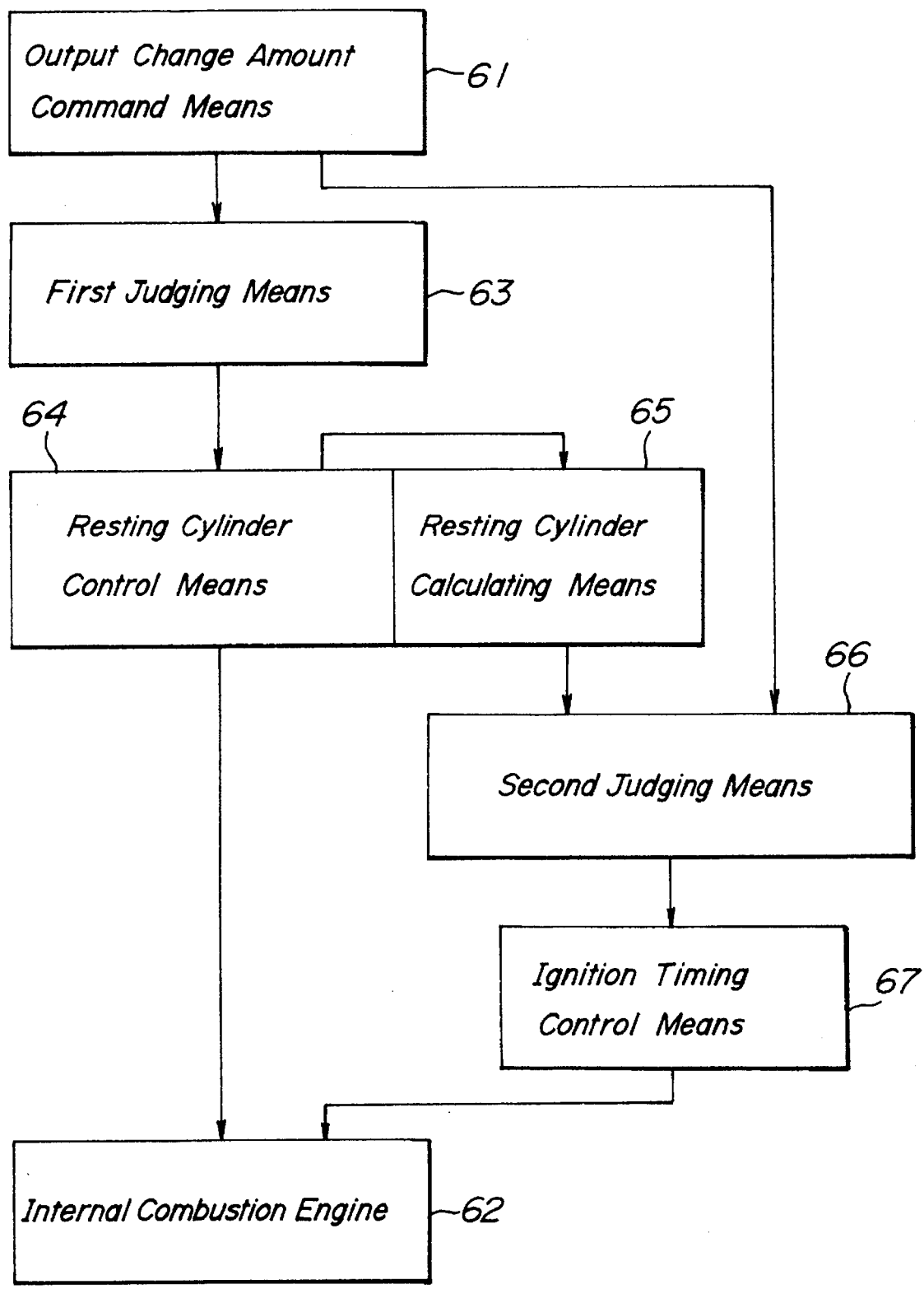
FIG. 2 is a flow chart illustrating a second concept of the output control system for internal combustion engine according to the present invention.

FIG. 2 is a block diagram illustrating a construction of the engine output control system according to a second concept of the present invention.

The engine output control system comprises an output change amount command means 61 for producing a control command for changing an output torque of an internal combustion engine 62 with a plurality of cylinders, a first judging means 63 responsive to said control command produced by the output change amount command means 61 to provided a first control command for denoting the number of active cylinders, a first control means 64 responsive to said first control command to control the number of active cylinders, a calculating means 65 for calculating the number of cylinders which have been in an actually resting state for a predetermined time period, a second judging means 66 responsive to said control command supplied by said output change amount command means 61 as well as to the number of resting cylinders calculated by said calculating means 65 to provide a second control command, and a second control means 67 responsive to said second control command to effect the retard control for the ignition timing of active cylinders of the internal combustion engine 62.

In this control system according to the second concept of the present invention, the retard control for the ignition timing is carried out in accordance with the number of cylinders which have been actually in the rest condition for the predetermined time period, so that the desired control of the output power of the engine 62 can be performed without causing undesired aberrations.

In the engine output control system according to the invention, when all the cylinders are operated and the retard control is not performed, the engine produces the standard output power having the maximum value, so that when one or more cylinders are brought into the rest condition and/or the ignition timing is retarded, the output power of the engine is decreased with respect to the standard output power. Therefore, the control command may denote a decreasing amount of the engine output power with reference to the standard output power. In such a case, even in the torque recovery, the control command denotes a decreasing amount of the output torque.

Figure 3:
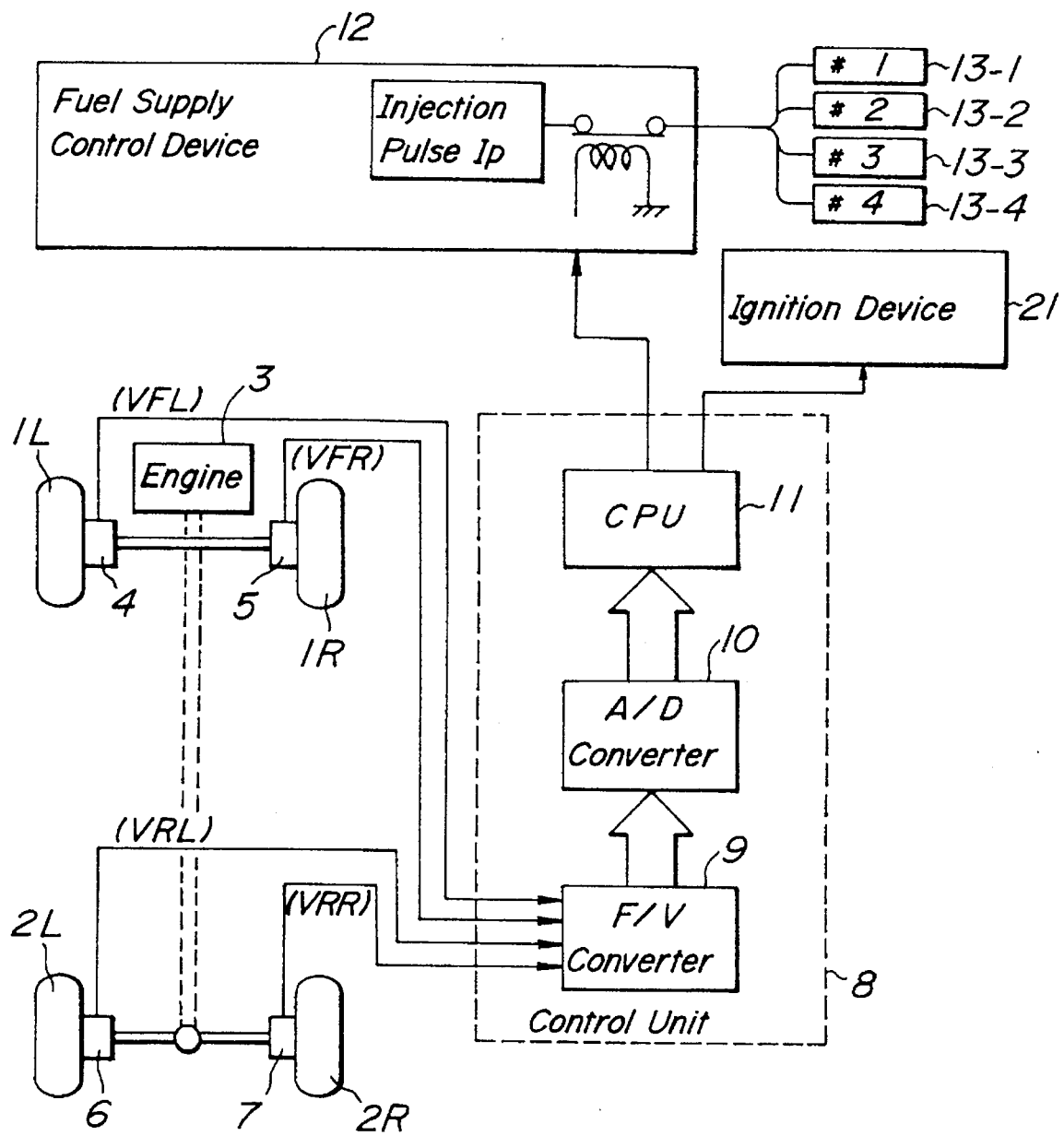
FIG. 3 is a schematic diagram depicting an embodiment of the engine output control system according to the invention.

FIG. 3 shows one embodiment of the output control system for an internal combustion engine according to the present invention. It should be noted that the present embodiment of the engine output control system is applied to the traction control system for use in an automobile in order to prevent driving wheels from spinning. In this embodiment, the adjustment of a driving torque is performed by way of fuel cut-off (F/C) for selected one or more engine cylinders.

In FIG. 3, 1L and 1R denote front-left and front-right wheels of an automotive vehicle, and 2L and 2R denote rear-left and rear-right wheels, respectively. A reference numeral 3 denotes an internal combustion engine as a prime mover of the vehicle. It should be noted that the present embodiment is applied for a 4-cylinder internal combustion engine and the vehicle has a $F_R$ (front engine-rear wheel drive) type power train layout for driving rear-left and rear-right wheels 2L and 2R. For respective wheels 1L, 1R, 2L and 2R, wheel speed sensors 4, 5, 6 and 7 are provided.

It should be appreciated that while the present embodiment of the engine output control system is applied for the vehicle of $F_R$ type power train layout, it is equally applicable to vehicles of any type of power train layout such as FF (front engine-front wheel drive) type and 4WD (four-wheel drive) type.

The wheel speed sensors 4 to 7 detect rotation speeds of respectively corresponding wheels and generate pulse signals having frequencies respectively indicating the rotation speeds of the wheels as wheel speed signals VFL, VFR, VRL and VRR. The wheel speed signals VFL, VFR, VRL and VRR are supplied to a frequency-to-voltage (F/V) converter 9 in a control unit 8. The control unit 8 includes, in addition of the F/V converter 9, an analog-to-digital (A/D) converter 10 and a CPU 11 formed by a microcomputer. The F/V converter 9 performs frequency-to-voltage conversion for the wheel speed signals VFL, VFR, VRL and VRR and generates corresponding voltage signals which are applied to the A/D converter 10. The A/D converter 10 converts the wheel speed indicating voltage signals into digital wheel speed data which are supplied to the CPU 11.

The CPU 11 detects a wheel slippage on the basis of the wheel speed data VFL, VFR, VRL and VRR and performs an engine output lowering or restriction control for controlling a driving torque for preventing the wheels from causing wheel spin. In the present embodiment, an output torque of the engine 3 is adjusted in order to adjust the driving torque distributed to the driving wheels 2L and 2R. In order to lower the engine output torque, a fuel supply control for effecting a fuel cut-off so that a part of or all of engine cylinders are placed in resting condition.

The fuel cut-off can be achieved by outputting a fuel cut-off signal from the CPU 11 to a fuel supply control device 12 which performs a fuel injection. In practice, the supply of fuel injection pulses Ip to respective cylinders (#1, #2, #3 and #4) 13-1 to 13-4 of the engine 3 is selectively shut off for one or more denoted cylinders, for which F/C is to be effected. By shutting off the fuel injection pulse, fuel cut-off can be performed. By placing one or more selected cylinders in the resting state, the engine output torque can be lowered. In an alternative, the fuel cut-off can also be performed by resetting a fuel injection period Ti derived by the CPU 11 to zero on the basis of the results of execution of a program of the shown embodiment, illustrated in FIGS. 5 to 9. Said fuel injection period Ti is calculated corresponding to a fuel injection amount according to a fuel injection amount calculation program executed in synchronism with an engine revolution cycle (combustion cycle). It should be noted that various other methods effective for performing fuel cut-off control may also be applicable for selectively rendering a cylinder into the resting state.

A spark ignition timing retard control is generally performed by supplying an ignition signal to a spark ignition device 21 from the CPU 11 at a controlled timing corresponding to a spark ignition timing which is retarded with respect to a normal timing by a time corresponding to an amount of the output torque to be decreased. By performing the fuel cut-off control or split cylinder control and the spark ignition timing control in combination, the driving torque of the engine 3 can be adjusted more precisely than that in the case where the split cylinder control is solely performed.

Namely, the split cylinder control can perform a relative large magnitude of engine output torque restriction in four steps, i.e. one cylinder is resting, two cylinders are resting, three cylinders are resting and all cylinders are resting. By employing the spark ignition control which cannot adjust the engine output torque in a large restriction magnitude as that achieved by the split cylinder control, but can perform more precise torque restriction control. Therefore, by effecting these controls in combination, the output torque of the engine 3 can be adjusted over a wide range in a precise manner.

In the fuel cut-off control for adjustment of the driving torque by the split cylinder control and the spark ignition timing retard control, the CPU 11 derives a wheel slippage and derives a necessary lowering or restriction magnitude of the driving torque on the basis of the wheel slippage. On the basis of the thus derived necessary drive torque lowering magnitude, the CPU 11 performs judgment of the engine operating condition and of the spark ignition timing to place one or more cylinders designated through engine operating condition judgment in resting condition, and, in combination therewith, to perform modification of the spark ignition timing on the basis of the spark ignition timing modification judgment for performing spark ignition control. According to the first concept of the present invention, the CPU 11 performs control for actually modify the spark ignition timing with a given delay time, when the number of cylinders to be placed in the resting condition is varied by the split cylinder control or F/C control.

Figure 4:
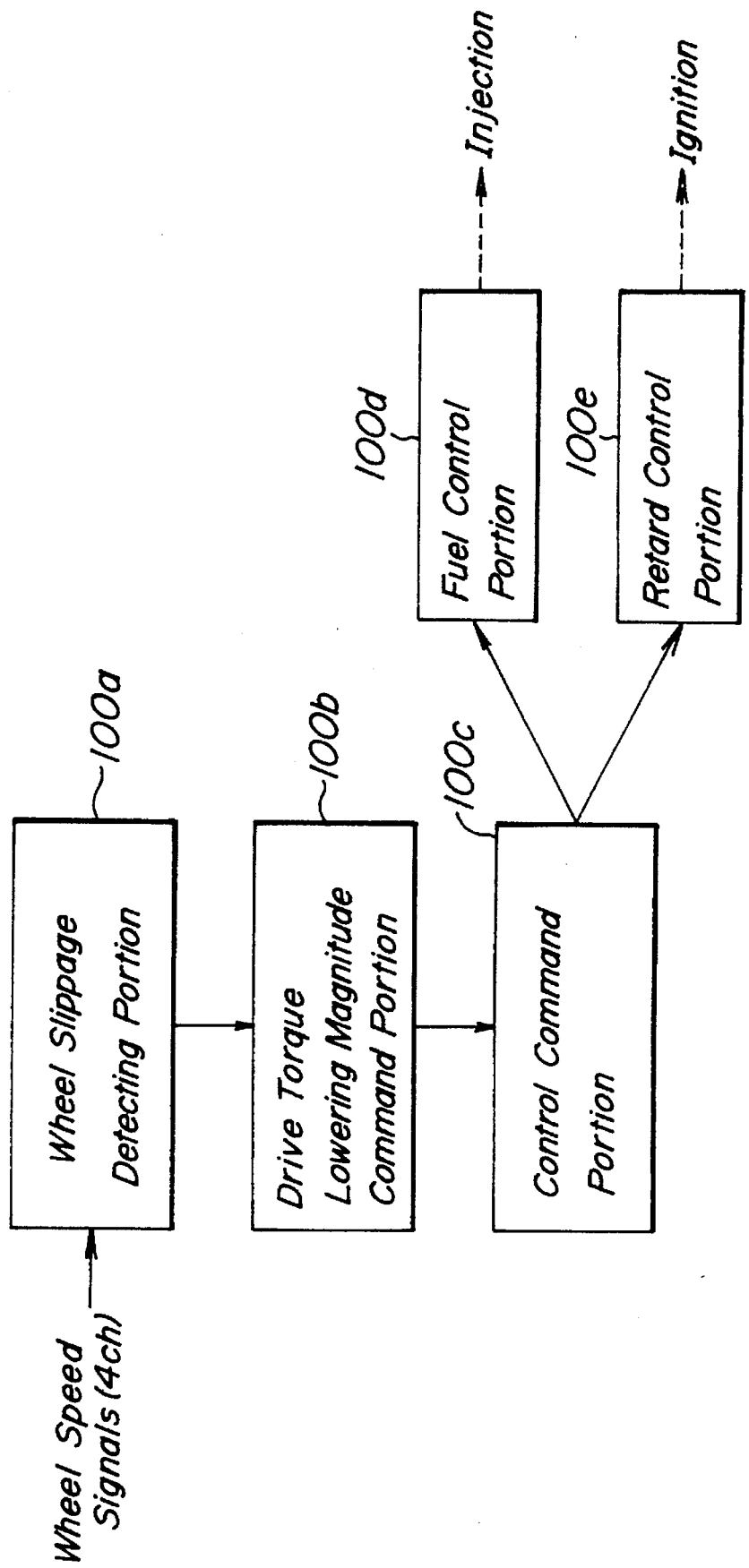
FIG. 4 is a flow chart showing the control unit in the engine output control system shown in FIG. 3.

FIG. 4 is a block diagram illustrating control functions to be performed by the present embodiment of the engine output control system of the present invention, in a form of a diagram of function blocks. In FIG. 4, the engine output control system includes a wheel slippage detect portion 100a, a drive torque lowering magnitude command portion 100b for providing a command for decreasing the engine output, an control command portion 100c for providing a first control command for controlling the operating condition of the cylinders and a second control command for controlling the ignition timing, a fuel control portion 100d for effecting the fuel cut-off for predetermined one or more cylinders in accordance with the first control command, and a retard control portion 100e for controlling the retardation of the ignition timing in accordance with the second control command. The wheel slippage detect portion 100a detects wheel slippage on the basis of the wheel speeds. Depending upon the detected wheel slippage magnitude derived by the wheel slippage detect portion 100a, the drive torque lowering magnitude command portion 100b determines a decreasing amount of the drive torque to supply the command to the control command portion 100c.

The control command portion 100c makes judgment for fuel cut-off and retarding control depending upon the command supplied from the command portion 100b and provides the first and second control commands. The fuel control portion 100d performs fuel cut-off operation for predetermined one or more cylinders according to a control routine (FIG. 9) which will be discussed later on the basis of the engine operating condition judgment. On the other hand, the retard control portion 100e performs the spark ignition timing control including a process for delaying an initiation of the retard condition with a given delay time under a predetermined condition according to a control routine (FIG. 10 or FIG. 14) which will be also discussed later.

Preferably, in this case, the given delay time is determined depending upon the engine revolution speed.

FIGS. 5 to 10 show control programs to be practically executed, these control programs corresponding to respective portions 100a to 100d set forth above.

Figure 5:
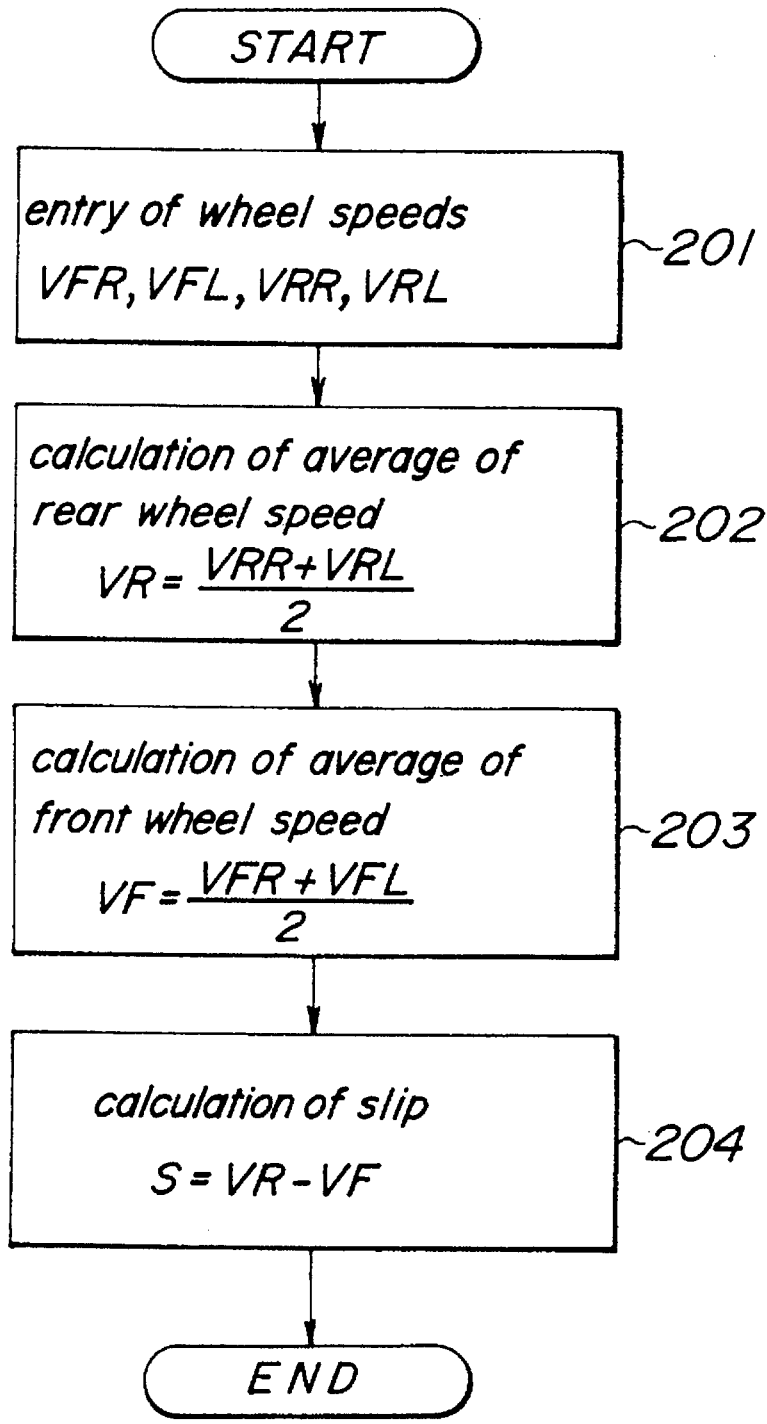
FIG. 5 is a flow chart representing a control program to be executed by the control unit.

FIG. 5 is a flow chart of a control routine for realizing process to be executed in the wheel slippage detect portion 100a. This program as well as program shown in FIGS. 6 and 7 may be periodically executed at constant period of times.

In FIG. 5, at a step 201, the wheel speeds VFL, VFR, VRL and VRR (4 ch) of the wheel speed indicative signals are read out. Then, an average speed VR of the rear two wheels 2RL and 2RR and an average speed VL of the front two wheels 1FL and 1FR are calculated respectively through the following equations (steps 202 and 203).

$$VR=(VRR+VRL)/2 \quad (1)$$

$$VF=(VFR \text{ and } VFL)/2 \quad (2)$$

Then, at a step 204, the wheel slippage S is calculated as a difference between the average speed VR of the rear wheels 2RL and 2RR and the average speed VF of the front wheels 1FL and 1FR.

$$S=VR-VF \quad (3)$$

Figure 6:
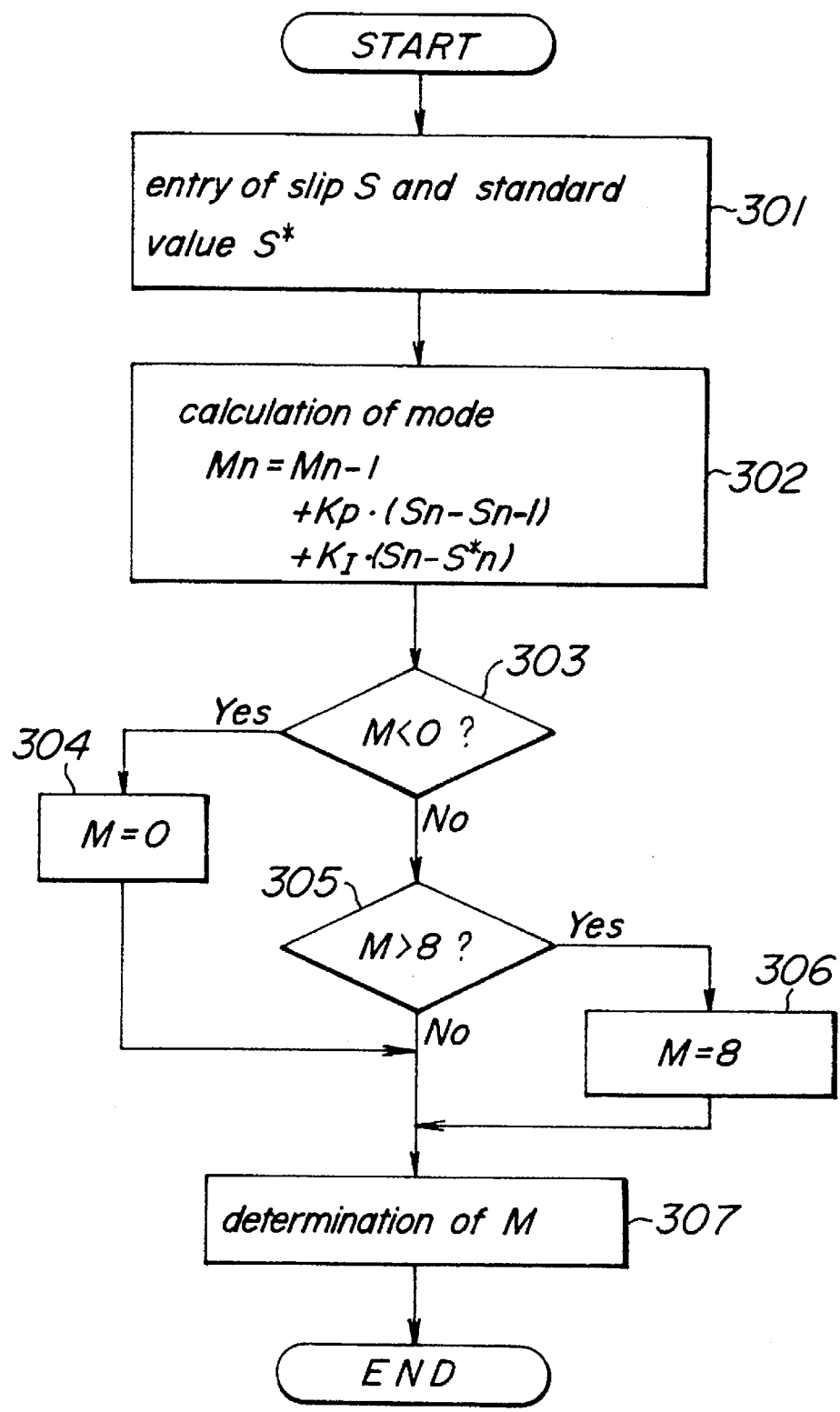
FIG. 6 is a flow chart of a mode determination routine for determining a mode for a drive torque restriction magnitude.

FIG. 6 is a flow chart showing a control routine which realizes a function corresponding to the drive torque lowering command portion 100b. The routine shown in FIG. 6 is executed after execution of the control routine of FIG. 5.

Initially, at a step 301, the foregoing wheel slippage S and a wheel slippage reference value S to be used in the drive force control are read out. Next, at a step 302, a mode value M indicative of the drive torque lowering magnitude is calculated from the following equation.

$$Mn=Mn-1+Kp.E(Sn-Sn-1)+KI.(Sn-S*n) \quad (4)$$

wherein Mn and Mn−1 are respectively currently calculated value and precedingly calculated value of the mode value, Sn and S*n are the wheel slippage and the currently adapted value of the slip reference value to be compared with the current wheel slippage Sn, KP and KI are respectively gains.

By comparing the derived wheel slippage S and the slippage reference value S* in the manner set forth above, the mode M indicative of the lowering magnitude of the drive torque is determined.

Judgment of M<0, setting of M=0, judgment of M>8 and setting of M=8 at the steps 303 to 306 are limiter processes for the mode value M derived at a step 302. Through these processes, the mode value M is limited within a range of minimum value 0 and the maximum value 8 corresponding to the number of steps of modes.

Figure 7:
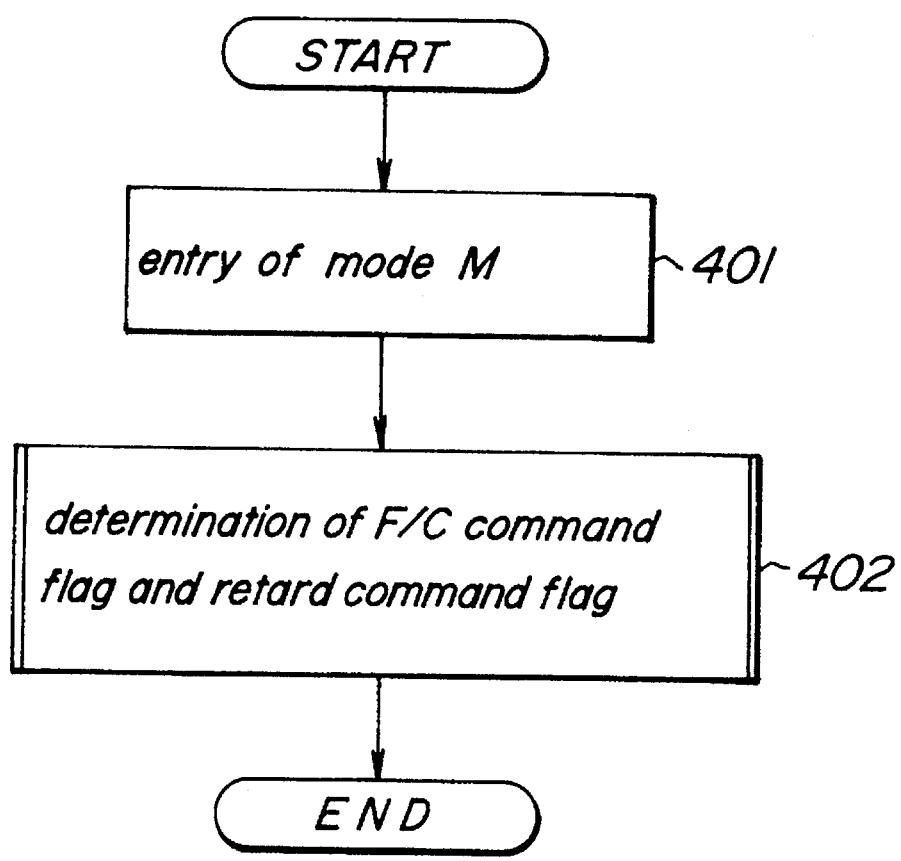
FIG. 7 is a flow chart showing a routine for making judgment of an engine operating condition and judgment for modification of a spark ignition timing.

After executing the limiter process through the steps 303 to 306, the mode value M within the limited range, i.e. 0 to 8 in the shown embodiment, is determined in a step 307, said mode value M being used in the control program illustrated in FIG. 7. As can be appreciated, the mode value M is determined depending upon wheel slippage from time to time at every timing of execution of the shown routine and is renewed with the most recent mode value.

FIG. 7 is a flow chart showing a routine for realizing the process corresponding to the content of the control command portion 100c.

Initially, in a step 401, the mode value M (most recent value) determined through the step 307 in the foregoing routine of FIG. 6, is read in at every execution timing.

Then, at a step 402, according to the read out mode value M, a F/C command flag $f_c$ for performing fuel cut-off for the cylinders #1 to #4 and a retard command flag $f_r$ for commanding retarding are determined with reference to a data map shown in FIG. 8, for example.

The data map shown in FIG. 8 denotes possible patterns in combinations of the F/C command flag $f_c$ and the retard command flag $f_r$ for the fuel cut-off control and retard control for achieving necessary torque lowering corresponding to the demanded drive torque lowering magnitudes. The data map defines respective command flags $f_c$ and $f_r$ with flag values 0 and 1 for respective modes, i.e. mode 0, 1, . . . 8. The flag value 0 represents inactive state of control and the flag value 1 represents active state of control.

In practice, in case of the F/C command flag $f_c$, when the flag value is 1, fuel cut-off is effected for the corresponding cylinder and when flag value is 0, fuel is supplied to the corresponding cylinder. On the other hand, in case of the retard command flag $f_r$ which represents presence and absence of retard control, when the flag value is 1, the retard control is effected and when the flag value is 0, the retard control is not performed so that spark ignition timing is maintained at normal timing.

In the mode 0, the F/C command flags $f_c$ for respective cylinders are 0 and the retard command flag $f_r$ is also 0. Therefore, neither the fuel cut-off nor the retard control are effected. Therefore, fuel is supplied for all of the cylinders #1 to #4 and the spark ignition is taken place at a normal timing so as not to cause lowering of torque (torque lowering rate is 0%).

In the mode 1, the fuel cut-off is not effected for any cylinder, but the spark ignition timing is to be retarded. In the mode 2, the fuel cut-off is to be effected for one cylinder (#1 cylinder), and retarding of the spark ignition timing is not effected. In the mode 3, the fuel cut-off is performed for one cylinder (#1 cylinder) and retarding of the spark ignition timing is effected.

As can be appreciated, according to stepping up of the mode number, lowering magnitude of the torque is increased. The torque lowering magnitude becomes maximum at the mode 8. Namely, in the mode 8, the F/C command flags for respective cylinders becomes 1, 1, 1, 1 to effect fuel supply for no cylinders (torque lowering rate is 100%). At this mode 8, retarding of the spark ignition timing is not effected, because all the cylinders are in inactive condition.

Here, it should be noted that the retarding of the spark ignition timing causes torque lowering magnitude of 12.5% which is a half of the torque lowering magnitude (25%) attained by one cylinder.

At every cycle of execution of the shown routines, the F/C command flag values and the retard command flag value are determined. The F/C command flag values and the retard command flag value thus determined are used in the process of the routines shown in FIGS. 9 and 10.

Figure 9:
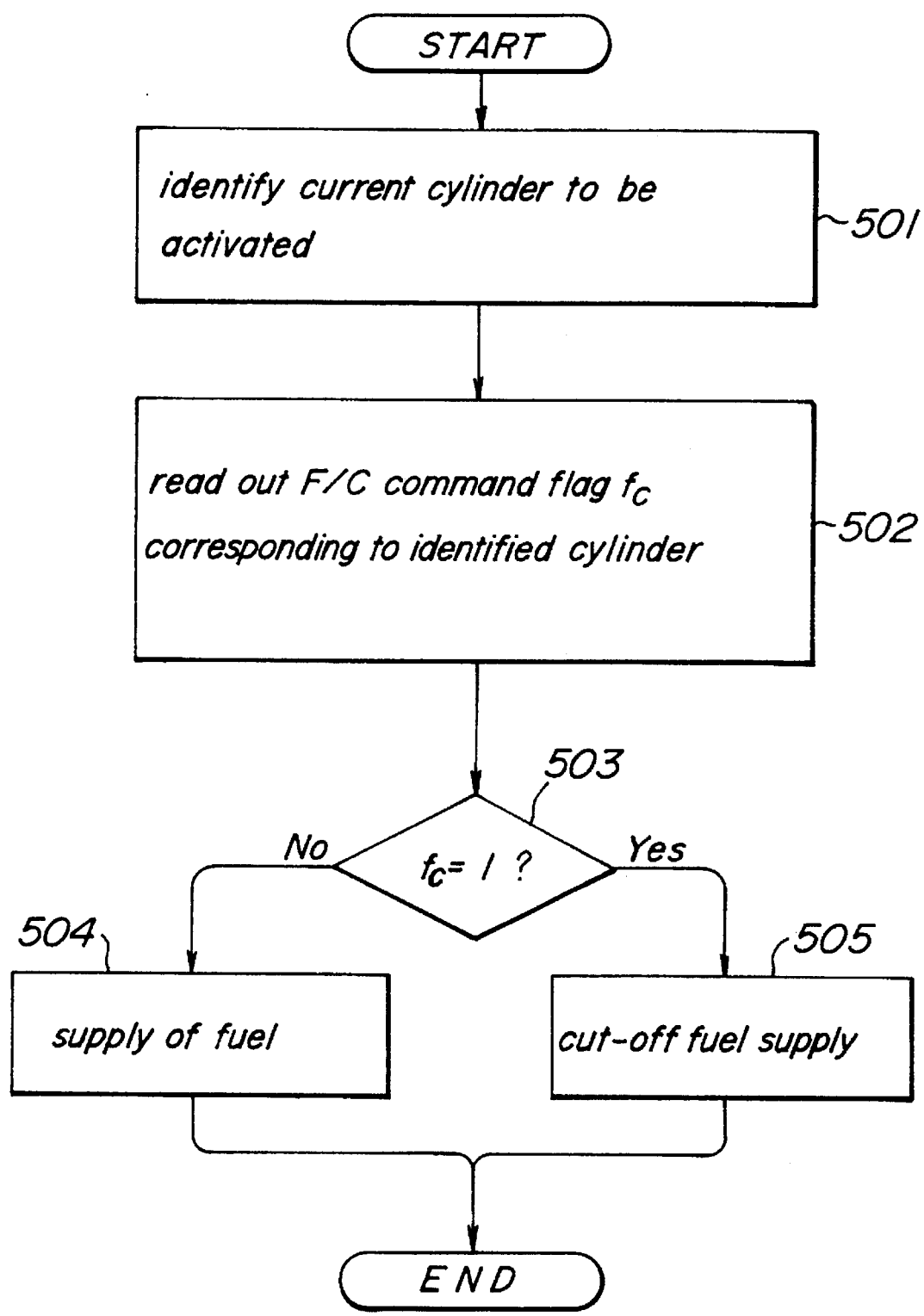
FIG. 9 is a flow chart of a control routine for controlling a fuel supply.

FIG. 9 shows a control routine for realizing the process corresponding to the content of the fuel control portion.

It should be noted that a sampling period in the process of the routine shown in FIG. 9 and the process in the retard control portion is different from that in the wheel slippage detect portion, the drive torque lowering magnitude command portion and the control command portion and thus is different from those of the control routines of FIGS. 5, 6 and 7. The sampling period for the fuel control portion is synchronized with the engine combustion cycle and the control routines of FIGS. 9 and 10 are executed in synchronism with this sampling period.

The control routine of FIG. 9 is executed by using the F/C command flag $f_c$ obtained through the control routine of FIG. 7. At first, in a step 501, a current cylinder at a current combustion timing is identified at every cycle of execution of the shown routine. Then, in a step 502, among the F/C command flags $f_c$ determined through the step 402 of the control routine of FIG. 7, one of the F/C command flags $f_c$ corresponding to the cylinder identified through the step 501 is read out. Then, depending upon a value of the thus read out flag, i.e. 1 or 0, fuel supply or cut-off is performed through steps 503, 504 and 505.

Concerning the fuel cut-off control, at every timing of combustion, the F/C command flag $f_c$ for the current cylinder is read out, and the fuel cut-off is performed for the relevant cylinder when the fuel cut-off is commanded, i.e. the F/C command flag $f_c$ is set to 1.

Figure 10:
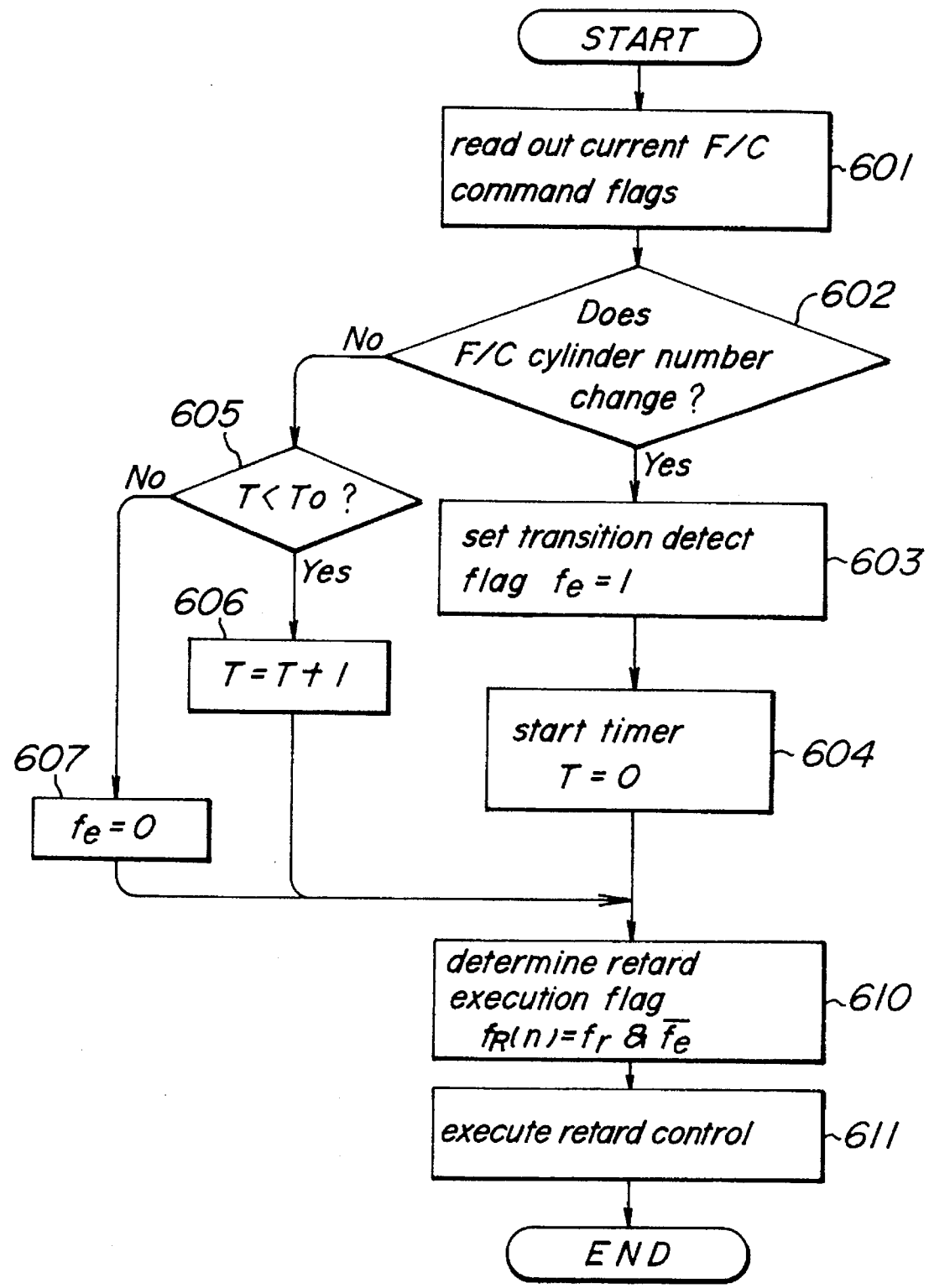
FIG. 10 is a flow chart of a control routine for modification of a spark ignition timing.

On the other hand, the control routine of FIG. 10 realizes a process corresponding to the content of the retard control portion.

At first, in a step 601, the instantaneous F/C command flags derived at the step 402 of the process of FIG. 7 are read out.

The read out F/C flag value $f_c(n)$ (current value) is compared with the immediately preceding F/C command flag value $f_c(n-1)$ for detecting a transition of the number of the resting cylinders. That is, the number of resting cylinders in the current F/C command flags, i.e. the number of flags of value 1 in the previous F/C command is compared with the number of resting cylinders denoted by the current F/C command flags, i.e. the number of flags of value 1 in the current F/C command.

On the basis of the result of comparison, a transition detect flag $f_e$ setting process (fe=1) and a timer starting process (T=0) are performed at steps 603 and 604, respectively when the transition or variation in the number of resting cylinders is detected. Otherwise, a timer monitoring process against T<T0 (timer set value), elapsed time measurement by incrementing timer value by T=T+1, and clearing of the transition detect flag $f_e$ ($f_e$=0) are performed in steps 605, 606 and 607, respectively.

When the variation in the F/C cylinder number is detected in the step 602 by checking the F/C command 15 flags, the steps 603 and 604 are executed once at that timing to set the transition detect flag fe. At the same time, a timer for measurement of the elapsed time T is started.

Here, the transition detect flag $f_e$ is set at a value 1 in the step 603, and is cleared to 0 in the step 607 when the measured period T reaches a predetermined value.

The value of the transition detect flag $f_e$ is used in a process for determining a retard execution flag $f_R$ at a step 610 together with the value of the retard command flag $f_r$. The retard execution flag $f_R$ determines if retarding of the ignition timing for the current combustion is effected or not.

The retard control is finally performed in a step 611, in which a retard control is executed according to the retard execution flag $f_R$. In the shown embodiment, the retard execution flag $f_R$ is adapted to be set at the step 610 when the value of the retard command flag $f_r$ determined in the step 402 of the control routine of FIG. 7 on the basis of the map in FIG. 8 is 1 and the value of the transistion detection flag $f_e$ is 0.

Figure 11:
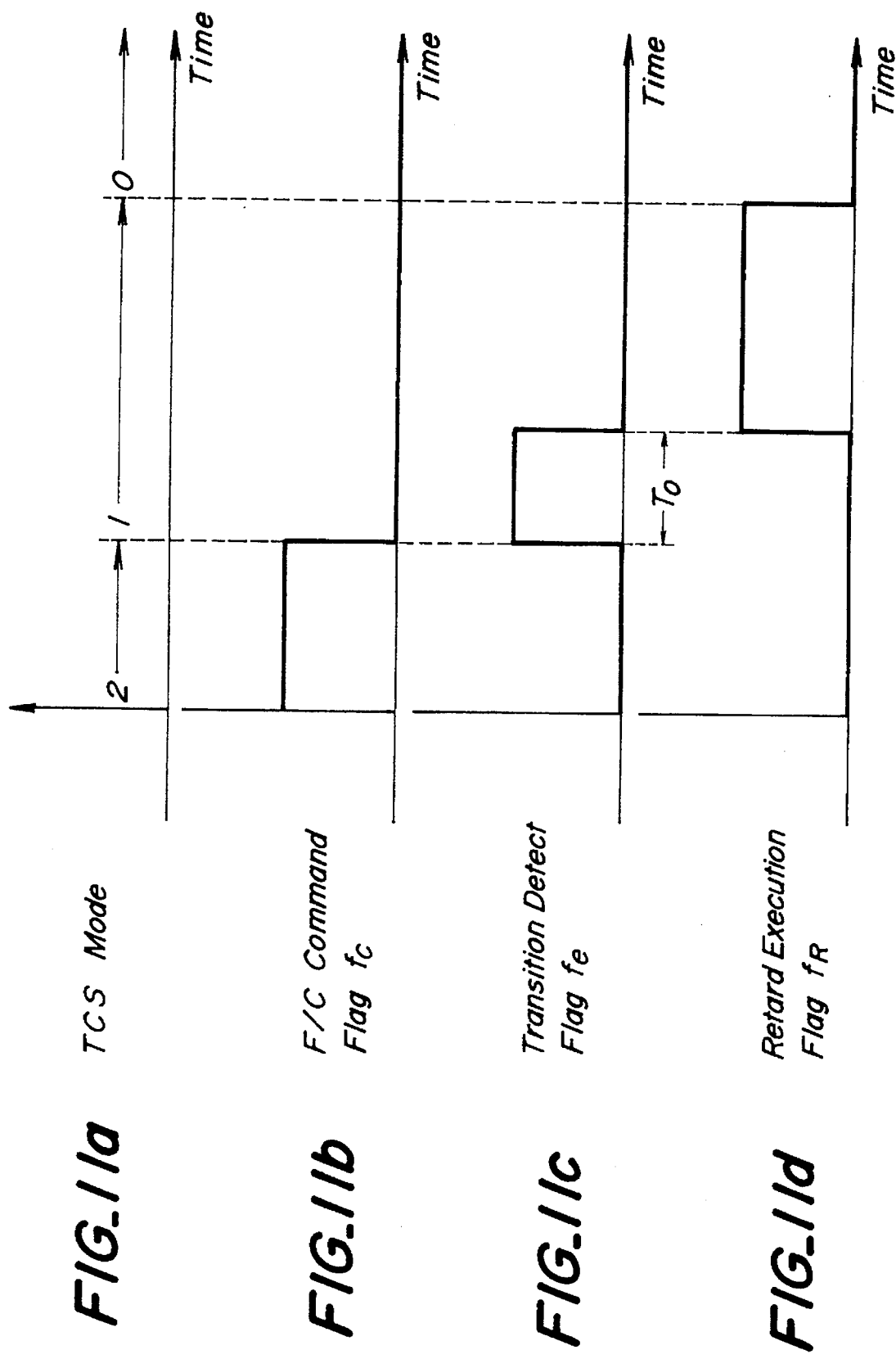
FIGS. 11a to 11d are timing charts showing a process in execution of a spark ignition timing retard control.
Figure 12:
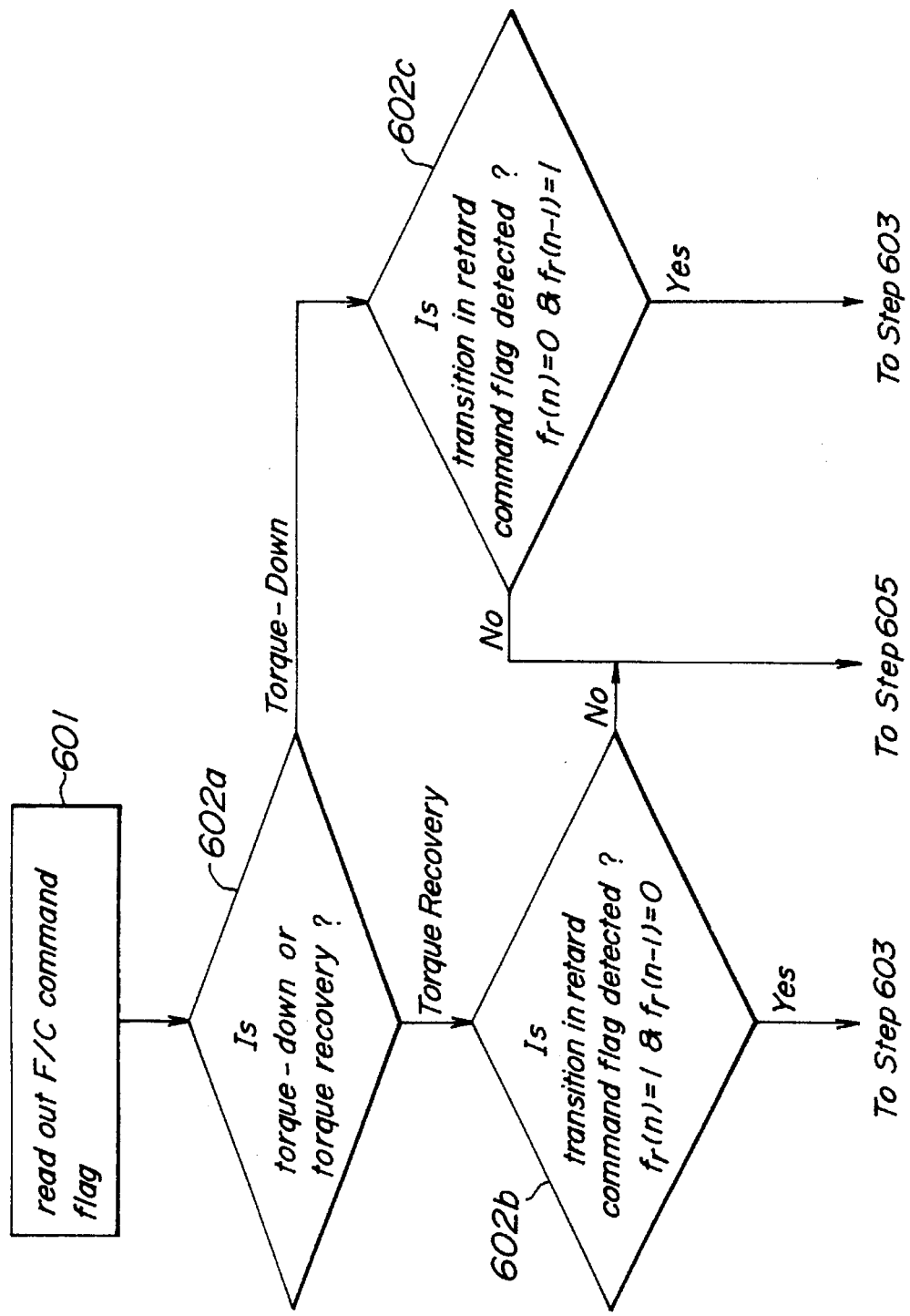
FIG. 12 is a flow chart of a major part of the control routine used in another embodiment of the spark ignition timing retard control.

In a time chart of FIG. 11, one example of a variation in respective flags during the execution of the routines associating with the mode modification is illustrated. FIG. 11a illustrates the variation of modes, and FIGS. 11b to 11d respectively show a variation in the F/C command flag $f_c$, the transition detect flag $f_e$ and the retard execution flag $f_R$.

As shown in FIG. 11, when transition, in which the value of the F/C command flag $f_c$ is switched from 1 to 0 as illustrated in FIG. 11b, the transition detect flag $f_e$ is set and maintained in the set condition for a predetermined period corresponding to a timer setting value $T_0$ as shown in FIG. 11c.

Namely, once the steps 603 and 504 are executed, in next and subsequent cycles of execution of the shown routine, timer check is performed (steps 605, 606). When the elapsed time becomes greater than or equal to the set value $T_0$, the transition detect flag $f_e$ is cleared to 0 (step 607).

Therefore, while the transition detect flag $f_e$ is held in the set state, the retard execution flag $f_R$ will not be set even when the value of the retard command flag $f_r$ is 1 as depicted in FIG. 11d. Therefore, retard control is not effected (steps 610, 611). Accordingly, the spark ignition timing is maintained at the normal timing so that ignition is taken place by the ignition device 21 for active cylinders (namely the cylinders having the value 0 of F/C command flags in the routine of FIG. 9) at a normal ignition timing. On the other hand, when the predetermined period corresponding to the set period $T_0$ is elapsed, since the value of the transition detect flag $f_e$ becomes 0 through the process in the step 607. In response to this, the retard execution flag $f_R$ is set to initiate the retard control at that timing.

Thus when the fuel cut-off control and retard control are combined, the fuel cut-off control is performed according to the F/C command flag $f_c$ determined on the basis of the map in FIG. 8. On the other hand, the retard control is effected only when the retard command flag is 1 and the transition detect flag $f_e$ is 0. In this case, the retarding magnitude is unchanged and thus is 12.5% corresponding to a half of the torque drop by a single resting cylinder. Therefore, only retarding timing is delayed.

It should be appreciated that the period while the transition detect flag $f_e$ is held in the set state in the routine of FIG. 10 for delaying initiation of the retard control, if the set value $T_o$ of the timer is constant, becomes proportional to the combustion period (thus inversely proportional to the engine speed), as expressed by:

Period during which flag $f_e$ has been set=combustion period×$T_0$ since the sampling period of the routine shown in FIG. 10 is consistent with the combustion period. Therefore, the delay period for setting the retard execution flag may be varied depending upon the engine driving condition, i.e. the engine speed.

On the other hand, in addition to the engine speed, it may be possible to vary the delay period depending upon a flow velocity of a fuel flowing through a suction pipe of the engine 3.

By the control set forth above, in a driving torque control performed in combination of the F/C control and the retard control, the drive torque can be controlled precisely. In addition, when the F/C control requires a change in the number of resting cylinders, the delay period is provided for initiation of the retard control so that hunting which might otherwise be caused at the transition state of the fuel cut-control can be successfully avoided. In this manner, undesired torque aberration at the transition of the mode may not occur to permit smooth drive torque control.

FIG. 11 shows a case in which the number of the resting cylinders varies and, similarly to FIG. 24, the mode is varied from the mode 2 to the mode 1 during the torque recovery. When the commands for the fuel cut-off control and retard control are issued for stepping down the mode from the mode 2 to the mode 1 for increasing the driving torque, the number of resting cylinders in the fuel cut-off control is reduced from 1 to 0 through the fuel cut-off control (see FIG. 8). At the same time, while the retard command flag $f_r$ is then varied from 0 to 1 for effecting retarding of the spark ignition timing (see FIG. 8) and the delay is provided in transition of the mode variation. Therefore, the drive torque is not varied abruptly and an aberration in the output torque as in the case of the known control system shown in FIG. 25 never occurs.

In the known control system shown in FIG. 24, the retard control is performed immediately after the mode is changed from mode the mode 2 to the mode 1 for increasing the drive torque, retarding of the spark ignition timing becomes effective at earlier timing than the timing where the fuel cut-off control becomes actually effective to temporarily cause stepped up mode which further decreased the drive torque, in transition of the mode variation. In contrast to this, according to the present embodiment, when the mode is steeped down from the mode 2 to the mode 1, while the retard control is performed according to the data map of FIG. 8 and retarding of the spark ignition timing is performed in any way, the initiation timing of the retard control is delayed so that the retard control becomes effective after the fuel cut-off control has become effective (FIGS. 11c and 11d). Therefore, the mode can be smoothly stepped down from the mode 2 to the mode 1 without temporarily interposing the mode 3, in which one cylinder is resting and the ignition timing is retarded.

As explained above, in the present embodiment, even by the driving torque control employing both of the fuel cut-off control and the retard control in combination, any undesired hunting of the control operation at the transition of the modes can be successfully avoided, and precise drive torque control becomes possible. Thus, the performance of the drive torque control can be improved so as to make the control more effective.

It should be noted that the present embodiment is not only effective in the torque recovery mode control in stepping down of the mode from the mode 2 to the mode 1 as set fourth above, but also effective in torque recovery mode control in stepping down of the mode from the mode 4 to the mode 3 or from the mode 6 to the mode 5. Namely, as shown in FIG. 8, the present embodiment is equally effective for any transition where the number of resting cylinders is decreased for recovering the drive torque by providing delay of the retard control initiation timing through the same process as those of FIGS. 10 and 11. On the other hand, when the mode is stepped down without causing a variation in the number of the resting cylinders, such as from the mode 1 to the mode 0, from the mode 3 to the mode 2 and so forth, stepping down of the mode can be performed instantly since the retard control may be terminated at an earlier timing than the initiation timing of the fuel cut-off control.

Namely, in the latter case where stepping down of the mode is to be performed without causing a variation in the number of the resting cylinders, the fuel cut-off control and retard control can be instantly initiated according to the content of commands determined on the basis of the data map shown in FIG. 8 through the routine of FIG. 9. The fuel cut-off control is thus effective for the cylinder currently at the combustion timing upon switching of the F/C command flag $f_c$. Also, the retard control is also effected instantly for switching the retard command flag $f_r$ from 1 to 0. For instance, in the case where the mode is stepped down from the mode 1 to the mode 0 to switch the retard command flag $f_r$ from the mode 1 to the mode 0 through the process illustrated in FIG. 7 on the basis of the map in FIG. 8, the commanded retard control is instantly performed immediately in response to stepping down of the mode from the mode 1 to the mode 0 to initiate the spark ignition control at normal timing. As can be appreciated, in the example set forth above, since no cylinder is resting and spark ignition timing is not retarded, the engine is operated with 0% of lowering rate of the drive torque.

The process set forth above is equally applicable for the case where the mode is stepped down from the mode 3 to the mode 2. Namely, in the mode 3, one cylinder is to be in rest (F/C command flags $f_c$ are 1, 0, 0, 0) and the spark ignition timing is retarded (retard command flag $f_r$ is 1), on the other hand, in the mode 2, one cylinder is in rest (F/C command flags $f_c$ are 1, 0, 0, 0) and the spark ignition timing is not retarded (retard command flag $f_r$ is 0). Therefore, by instantly terminating retard control in response to a variation of the mode from the mode 3 to the mode 2, torque can be instantly recovered in the corresponding magnitude, i.e. 12.5% without causing temporarily lowering of the torque.

While the foregoing discussion has been given for the case of the torque recovery, a similar process may be applied for the case of lowering of the drive torque. For instance, when the mode is stepped up from the mode 1 to the mode 2, the hunting of the mode may not be caused unless the process of the present embodiment is applied. Namely, for entering into the mode 2 of drive torque control, fuel cut-off has to be performed for one cylinder.

Now a third embodiment of the engine output control system according to the first concept of the invention will be explained with reference to FIGS. 13 to 16.

In the present embodiment, in order to control the output torque of the engine much more precisely or definitely, the retard control of the ignition timing is performed by using a plurality of levels. For the sake of simplicity, in the present embodiment the ignition timing is retarded by two levels, but it should be noted that the number of retard control levels may be set to a value other than two. In the first level of the ignition timing control, the ignition timing is retarded with respect to the normal ignition timing by such an amount that the engine output power is decreased by a third of a nominal output power of a single cylinder which is driven at the normal ignition timing and in the second level, the ignition timing is retarded by such an amount that the engine output power is decreased by two thirds of the nominal output power of a single cylinder. Furthermore, in the present embodiment, the execution of the retard control for the ignition timing is delayed only when the retard control is changed from a non-control state into a control state.

The basic construction of the system according to the present invention is identical with that of the previous embodiments, so that the operation of the wheel slippage detecting portion 100a and fuel control portion 100d shown in FIGS. 5 and 9 is not explained.

Figure 13:
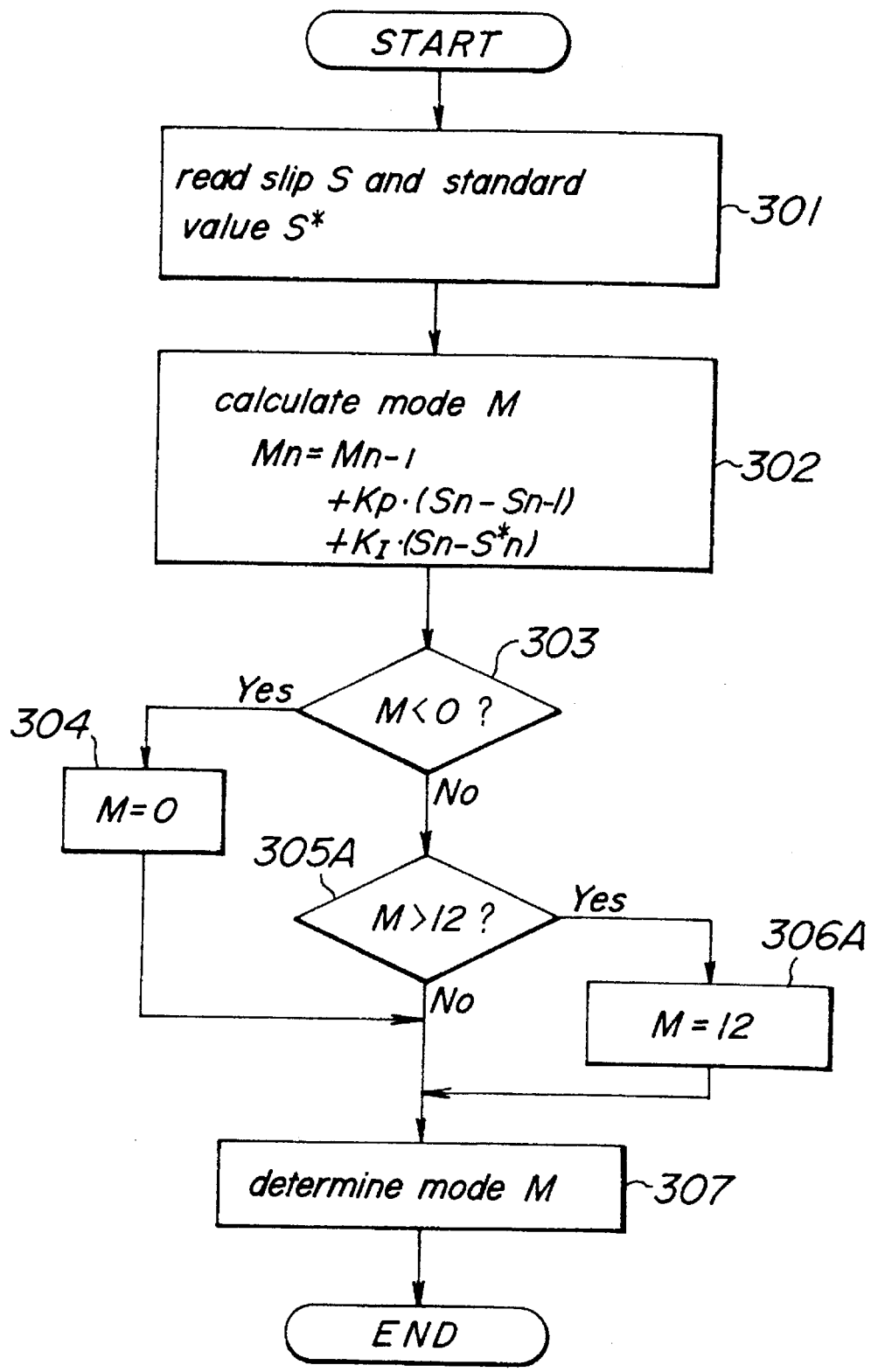
FIG. 13 is a flow chart of the control routine for determining a mode in another embodiment of the control system according to the invention.

FIG. 13 is a flow chart illustrating the process to be executed by the command portion 100b for providing the control command indicating an amount of a decrease in the output torque with respect to the nominal output torque which is obtained when neither F/C control nor retard control are effected. Upon comparing the flow chart shown in FIG. 6, it is apparent that in the present embodiment, the maximum mode number is increased from 8 to 12 due to the increase in the number of retard control levels.

FIG. 14 is a schematic view representing a data map to be used in the control command portion 100c for determining the F/C command flags $f_c$ and retard command flag fr.

The whole process of the present embodiment is similar to that of the previous embodiment shown in FIG. 7, but the process for determining the F/C command flags and retard command flag differs from that of the previous embodiment. That is, in the present embodiment, the retard control is performed by using two control levels as illustrated in FIG. 14. As shown in FIG. 14, in the mode 1, the value of the retard command flag is set to 1, and in the mode 2, the value of the retard command flag is set to 2, while in both modes the F/C cylinder number is zero. Also in the mode 4, the value of the retard command flag is set to 1, and in the mode 5, the value of the retard command flag is set to 2, while the F/C cylinder number is set to 1 in both modes 4 and 5. In this manner, in the present embodiment, a retard command flag is set to one of the values of 0, 1 and 2. To this end, the retard command flag is constructed by two bits, while in the previous embodiments, the retard command flag is sufficiently formed by a single bit, because the retard command flag has one of the two values 0 and 1. Therefore, the F/C command flags $f_c$ for respective engine cylinders #1 to #4 and the retard command flag $f_r$ having a value 0 or 1 or 2 are determined in accordance with the denoted mode M which is determined by the step 307 of the program shown in FIG. 13.

Figure 15:
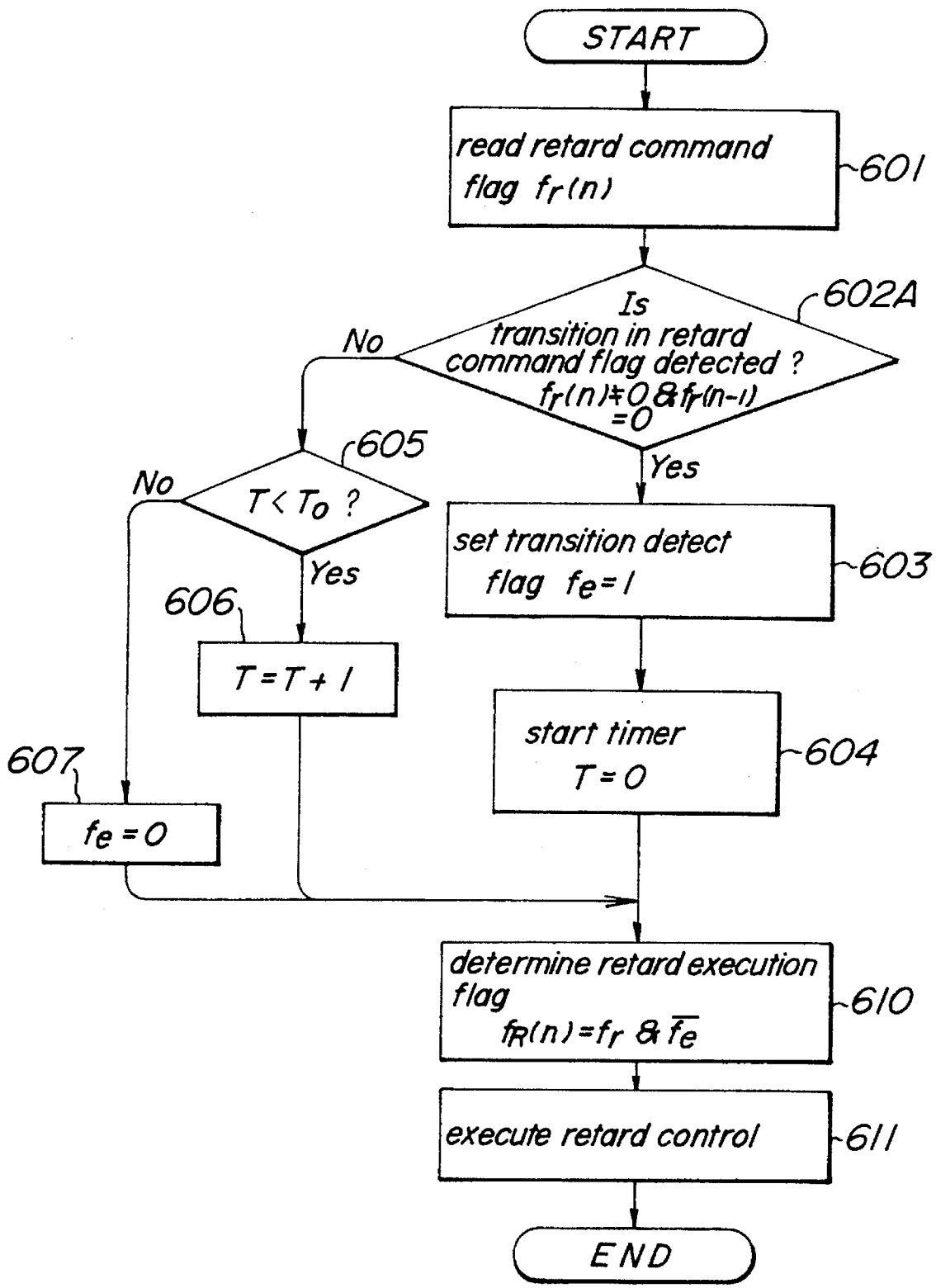
FIG. 15 is a flow chart of the control routine for modification of a spark ignition timing.

FIG. 15 is a flow chart representing the operation in the retard control portion 100e. In a step 602A, it is judged whether the current retard command flag $f_r(n)$ is not zero and the last retard command flag $f_r(n-1)$ is zero. When it is judged that the current retard command flag $f_r(n)$ is not zero and the last retard command flag $f_r(n-1)$ is zero, the transition detect flag $f_e$ is set to 1. In other words, when the retard command flag is changed from 0 to 1 or 2, the transition detect flag is set to 1. This is due to the fact that in the data map illustrated in FIG. 14, a change in the number of resting cylinders occurs only when the value of the retard control flag $f_r$ is changed from 0 to 1 or 2 as well as from 1 or 2 to 0.

FIGS. 16a to 16d show timing charts for explaining the retard control in the present embodiment. Now it is assumed that the mode M is changed from the mode 3 into the mode 1 via the mode 2. When the mode 3 is changed into the mode 2 as illustrated in FIG. 16a, the number of resting cylinders is changed from one to zero as can be read from the data map shown in FIG. 14. Then, the transition detect flag $f_e$ is set for a given time period $T_0$ determined by the timer as depicted in FIG. 16c, so that the retard control is delayed by this time period $T_0$ as shown in FIG. 16d. After that, the retard control is executed by changing the level 2 to level 1 when the mode is changed from the mode 2 to the mode 1. It should be noted that this change in the mode from 2 to 1 does not accompany a change in the number of resting cylinders, so that the retard execution flag $f_r$ is changed from 2 to 1 without any delay.

Also in the present embodiment, the same functional effect as that obtained in the previous embodiments can be attained and further the output torque of the internal combustion engine can be controlled much more precisely and definitely, so that the effectiveness of the combination of the F/C control and the retard control can be enhanced.

It should be noted that also in the present embodiment, the delay time of the retard control may be advantageously determined in accordance with the engine running speed. Moreover, according to the invention, the two level retard control of the present embodiment may be equally applied to the previous embodiments.

Now an embodiment in accordance with the second concept of the present invention will be explained. In the embodiments so far explained, when the retard control is accompanied by a change in the number of resting cylinders, the retard control is delayed for such a time period that the number of resting cylinders has been changed in accordance with the F/C command before effecting the retard control. In the second concept of the present invention, the retard control is effected depending upon the number of actually resting cylinders for a given time period.

The present embodiment is also applied to the traction control system for preventing the wheel spin, so that its basic construction is identical with that shown in FIG. 2 and the wheel slippage detecting portion 100a, drive torque decreasing or increasing amount determining portion 100b and F/C control portion 100d operate in the same manner as the first embodiment.

Now the present embodiment will be explained with reference to FIGS. 17 to 22.

FIG. 17 is a flow chart representing the operation of judgment of the active cylinders in accordance with the driving torque decreasing amount command value. In a step 1401, the command value determined by the torque decreasing amount command portion 100b, i.e. a current mode M determined by the step 307 in the process shown in FIG. 6 is read in, and in a step 1402, F/C command flags $f_c$ for respective cylinders #1 to #4 are determined in accordance with the mode M with reference to a data map illustrated in FIG. 18. The thus determined F/C command flags are applied to the fuel control program shown in FIG. 9 as well as to a control program shown in FIG. 19. It should be noted that in the present embodiment, the data map does not include the retard flag data.

Figure 19:
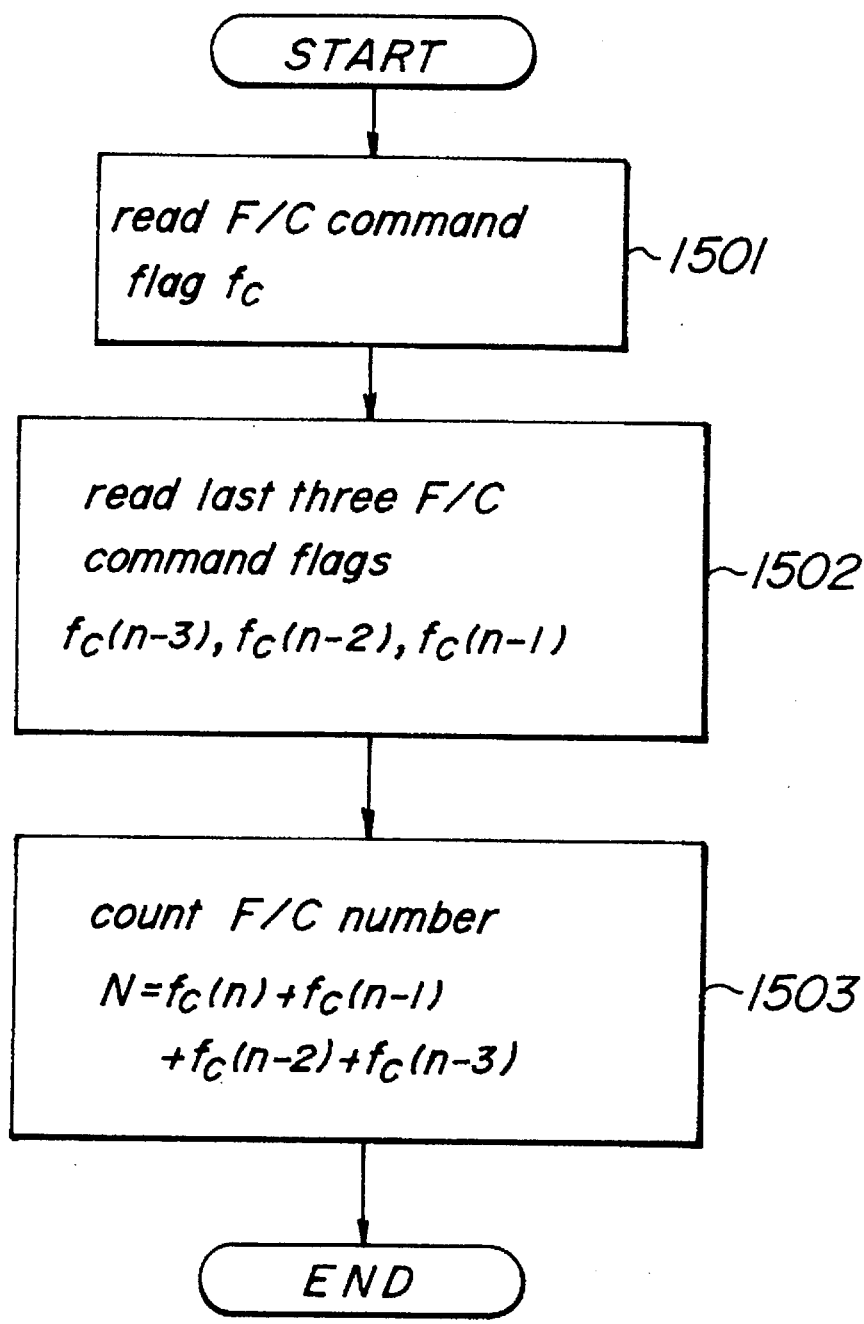
FIG. 19 is a flow chart of the control routine for deriving number of times of effecting F/C.
Figure 20:
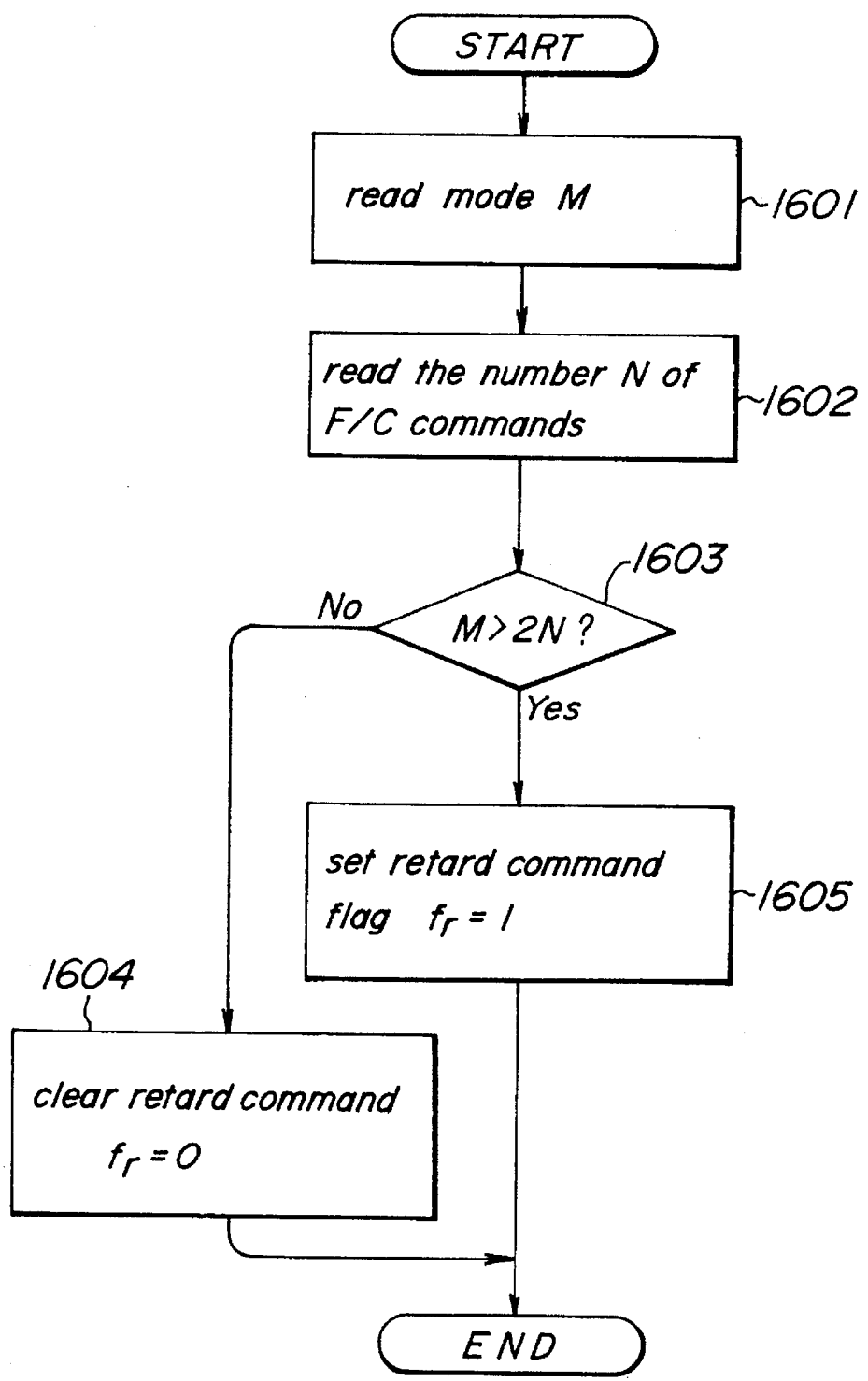
FIG. 20 is a flow chart of the control routine for determining the retard command flag.
Figure 21:
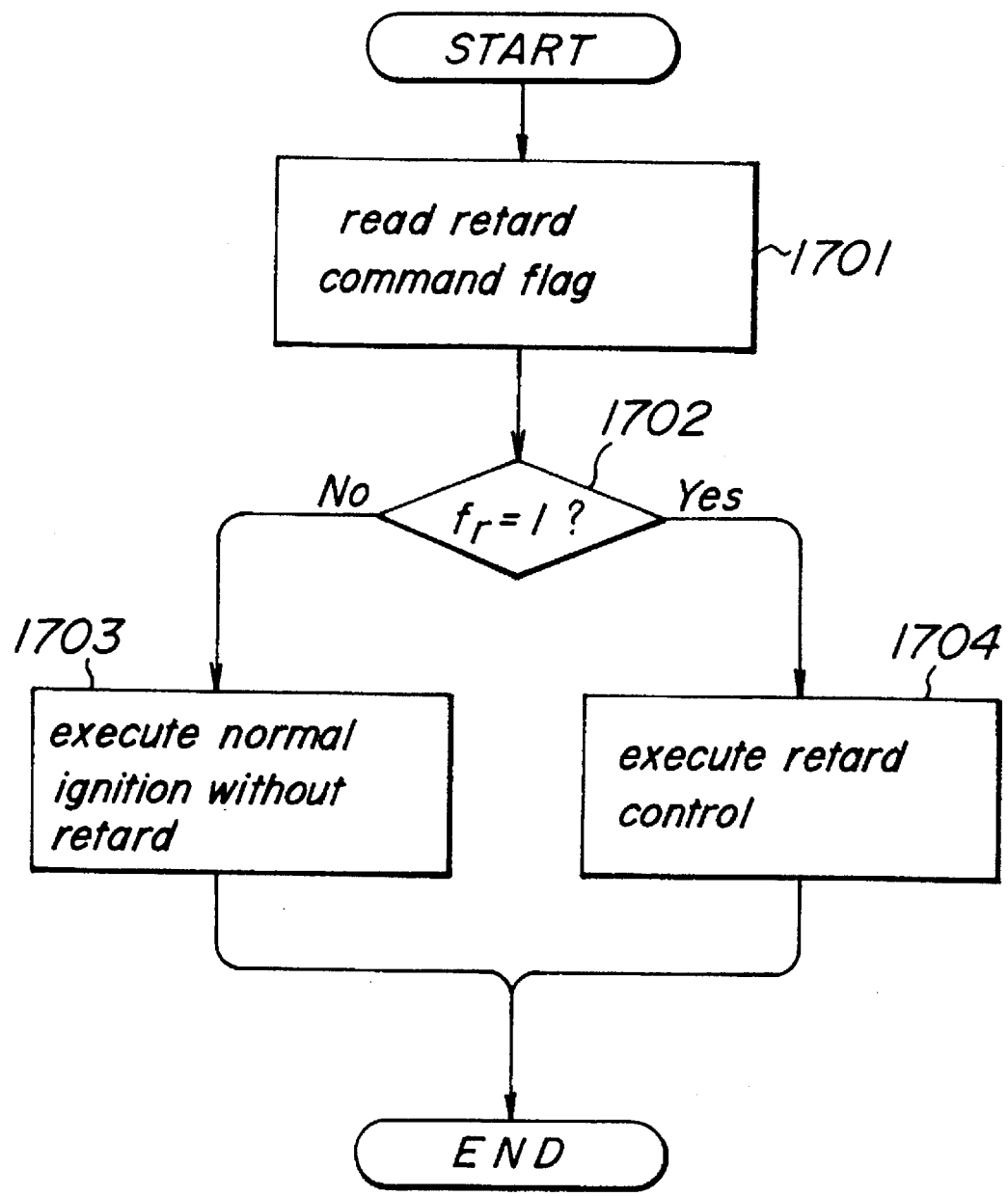
FIG. 21 is a flow chart of the control routine for modifying the spark ignition timing.

FIG. 19 is a flow chart representing the process of an F/C monitor portion including the first judging means 63 for providing the F/C commands, F/C controlling means 64 and the means 65 for calculating the number of actually resting cylinders (see FIG. 2). The operation of the F/C monitoring portion 63, 64, 65 is performed in synchronism with the engine combustion timing. Sampling periods for programs shown in FIGS. 20 and 21 are also synchronized with the engine combustion timing. That is to say, the processes shown in FIGS. 19, 20 and 21 are carried out each time the engine performs a single combustion.

In FIG. 19, in a step 1501, a F/C command flag $f_c(n)$ is read in for a cylinder which is destined to be fired in a relevant combustion period. Then, in a step 1502, the last three F/C command flags $f_c(n-1)$, $f_c(n-2)$ and $f_c(n-3)$ are read in. To this end, it is necessary to store at least the last three F/C command flags in a memory provided in the control unit. In a step 1503, the number N of the successive four F/C command flags, i.e. current F/C command flags $f_c(n)$ and the last three F/C command flags $f_c(n-1)$, $f_c(n-2)$ and $f_c(n-3)$ having the value 1 is calculated. It should be noted that this number of four F/C command flags corresponds to the number of cylinders of the engine.

$$N = f_c(n) + f_c(n-1) + f_c(n-2) + f_c(n-3) \tag{5}$$

It should be noted that the number N has a value of 0 to 4 depending upon the value of F/C command flags. The thus calculated number N is used in the program shown in FIG. 20 and is compared with the mode M.

FIG. 20 is a flow chart showing the process for determining the retard control. In a step 1601, the mode M determined by the step 307 in the program shown in FIG. 6 is read in, and in a next step 1602, the number N of F/C command flags having the value 1 obtained by the process illustrated in FIG. 19 is read in. Then, in a step 1603, the mode M is compared with the number N multiplied by two (2N) and when M is not larger than 2N, the retard control is not effected and the relevant combustion is carried out with the normal ignition timing. In this case, the retard command flag $f_r$ is cleared in a step 1604. However, when the mode M is larger than 2N, the retard control is performed in the relevant combustion period and the retard command flag $f_r$ is set to one ($f_r=1$).

FIG. 21 is a flow chart showing the program for performing the retard control in the present embodiment. In a step 1701, the retard command flag $f_r$ determined by the program illustrated in FIG. 20 is read in. Next, in a step 1702, it is judged whether the retard command flag $f_r$ is set to 1 or not. When the retard command flag $f_r$ is set to 0, in a step 1703, the combustion is carried out with the normal ignition timing, but when the retard command flag $f_r$ is set to 1, in a step 1704, the ignition timing is retarded to decrease the engine output torque.

Also in the present embodiment, the retard control is effected when the number of resting cylinders is changed, so that any undesired aberration in the engine output does not occur and the decreasing or increasing control in the engine output can be performed without undesired hunting.

FIG. 22 is a schematic diagram representing the function of the present embodiment. It is assumed that the mode M is changed from the mode 2 into the mode 1 like as in the case of the operation shown in FIG. 24 which illustrates the operation of the known control system. As shown in FIG. 24, between the mode 2 and the mode 1 there is interposed the mode 3, so that the engine output includes the undesired aberration as depicted in FIG. 25. In the present embodiment, even if the mode is changed from the mode 2 to the mode 1, the retard control is not performed, because the number N of resting cylinders during the last four sampling periods is 1. That is to say, the condition M>2N is not satisfied. Therefore, the actual mode is remained in the mode 2. However, after four sampling periods, i.e. four combustion periods have elapsed (current cylinder is #1), the number N is changed from 1 to 0, so that the condition M>2N is satisfied, and therefore the retard control is carried out and the actual mode is changed into the mode 1. If the mode is further changed from the mode 1 to the mode 0, the condition M>2N is not satisfied, so that the retard control is not effected and the maximum engine output can be attained.

In the present embodiment, when a change of the mode is denoted such that it requires a change in the number of resting cylinders, the change in the resting cylinders is first carried out and then the retard control is performed, so that the decrease or increase in the engine output can be effected smoothly without causing any undesired aberration.

The present invention is not limited to the above explained embodiments, but many modifications and alternations may be conceived by those skilled in the art within the scope of the invention. For instance, a cylinder is rendered into a resting state by cutting-off the fuel supply, but according to the invention, the ignition may be cut-off instead of or in addition to the fuel supply cut-off.

As explained above in detail, according to the invention, in case of controlling the output torque of the internal combustion engine having a plurality of cylinders, it is possible to remove any undesired aberration in the engine output torque, so that the engine output torque can be decreased or increased very smoothly. Therefore, the control performance of the combination in the resting cylinder control and the ignition timing retard control can be improved.

What is claimed is:

1. A system for controlling an output torque of an internal combustion engine having a plurality of cylinders comprising:

a command means for generating a control command to increase or decrease an output torque of the internal combustion engine;

a judging means responsive to the control command for providing a first control command for controlling operation of the cylinders of the engine and a second control command for controlling a retard of an ignition timing;

a first control means responsive to said first control command for bringing one or more cylinders of the engine in a resting state;

a second control means responsive to said second control command for retarding the ignition timing for cylinders which are not in the resting state;

whereby when said first control command requires a change in the number of cylinders in the resting state, the retardation of the ignition timing to be performed by said second control command is delayed for a given delay time.

2. A system according to claim 1, wherein the system is adapted for use in a traction control system for an automobile including two front wheels and two rear wheels, and wherein said command means detects a difference between an average running speed of the two front wheels and an average running speed of the two rear wheels and generates said control command including a mode Mn responsive to said difference.

3. A system according to claim 2, wherein said judging means comprises a data map representing a relationship between said mode Mn in the control command and said first and second control commands.

4. A system according to claim 1, wherein said first control means cuts-off a supply of a fuel to a relevant cylinder.

5. A system according to claim 1, wherein said given delay time is determined in accordance with a running speed of the engine.

6. A system according to claim 1, wherein said second control means retards the ignition timing for one of a plurality of retard times.

7. A system for controlling an output torque of an internal combustion engine having a plurality of cylinders comprising:

a command means for producing a control command to change an output torque of the internal combustion engine;

a first judging means responsive to said control command for providing a first control command for denoting the number of cylinders which are to be brought into a resting state;

a first control means responsive to said first control command for bringing a given number of cylinder or cylinders into the resting state;

a calculating means for calculating the number N of cylinders which have been in the resting state for a predetermined time period;

a second judging means responsive to both said control command and the number N of resting cylinders calculated by said calculating means for providing a second control command; and a second control means responsive to said second control command for retarding an ignition timing of active cylinders of the internal combustion engine.

8. A system according to claim 7, wherein the system is adapted for use in a traction control system for an automobile including two front wheels and two rear wheels, and wherein said command means detects a difference between an average running speed of the two front wheels and an average running speed of the two rear wheels and generates said control command including a mode Mn responsive to said difference.

9. A system according to claim 8, wherein said judging means comprises a data map representing a relationship between said mode Mn in the control command and said first control command.

10. A system according to claim 7, wherein said first control means cuts-off a supply of a fuel to a relevant cylinder.

11. A system according to claim 7, wherein said second control means retards the ignition timing for one of a plurality of retard times.

12. A system according to claim 7, wherein said predetermined time period during which said number N of the resting cylinders is calculated is determined based on the number of the plurality of cylinders of the engine and a combustion period.

13. A method of controlling an output torque of an internal combustion engine having a plurality of cylinders comprising the steps of:

generating a control command to increase or decrease an output torque of the internal combustion engine;

responding to the control command by providing a first control command for controlling operation of the cylinders of the engine and a second control command for controlling a retard of an ignition timing;

bringing one or more cylinders of the engine in a resting state responsive to said first control command;

retarding the ignition timing for cylinders which are not in the resting state responsive to said second control command; and when said first control command requires a change in the number of cylinders in the resting state, delaying retarding the ignition timing for a given delay time.

14. A method according to claim 13, wherein the method is adapted for use in a traction control system for an automobile including two front wheels and two rear wheels, and wherein prior to the step of generating a control command, the method further comprises the step of:

detecting a difference between an average running speed of the two front wheels and an average running speed of the two rear wheels;

the control command including a mode Mn and being generated responsive to said difference.

15. A method according to claim 13, wherein said step of bringing one or more cylinders of the engine in a resting state comprises cutting-off a supply of a fuel to a relevant cylinder.

16. A method according to claim 13, wherein prior to the step of delaying retarding the ignition timing, the method includes the step of determining said given delay time in accordance with a running speed of the engine.

17. A method for controlling an output torque of an internal combustion engine having a plurality of cylinders comprising:

generating a control command to change an output torque of the internal combustion engine;

responding to said control command by providing a first control command for denoting the number of cylinders which are to be brought into a resting state;

bringing a given number of cylinder or cylinders into the resting state responsive to said first control command;

calculating the number N of cylinders which have been in the resting state for a predetermined time period;

responding to both said control command and the number N of resting cylinders calculated by said calculating means for providing a second control command; and retarding an ignition timing of active cylinders of the internal combustion engine responsive to said second control command.

18. A method according to claim 17, wherein the method is adapted for use in a traction control system for an automobile including two front wheels and two rear wheels, and wherein said and wherein prior to the step of generating a control command, the method further comprises the step of:

detecting a difference between an average running speed of the two front wheels and an average running speed of the two rear wheels;

the control command including a mode Mn and being generated responsive to said difference.

19. A method according to claim 17, wherein said step of bringing a given number of cylinder or cylinders into the resting state comprises cutting-off a supply of a fuel to a relevant cylinder.

20. A method according to claim 17, wherein said step of calculating the number N of cylinders which have been in the resting state for said predetermined time period includes determining said predetermined time period based on the number of the plurality of cylinders of the engine and a combustion period.

* * * * *